US011358093B2

(12) United States Patent
Ho et al.

(10) Patent No.: US 11,358,093 B2
(45) Date of Patent: Jun. 14, 2022

(54) METHODS FOR THE SEPARATION OF $CO_2$ FROM A GAS STREAM

(71) Applicant: OHIO STATE INNOVATION FOUNDATION, Columbus, OH (US)

(72) Inventors: W.S. Winston Ho, Columbus, OH (US); Yang Han, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 493 days.

(21) Appl. No.: 15/577,951

(22) PCT Filed: May 23, 2016

(86) PCT No.: PCT/US2016/033757
§ 371 (c)(1),
(2) Date: Nov. 29, 2017

(87) PCT Pub. No.: WO2016/196056
PCT Pub. Date: Dec. 8, 2016

(65) Prior Publication Data
US 2018/0133643 A1 May 17, 2018

Related U.S. Application Data

(60) Provisional application No. 62/303,938, filed on Mar. 4, 2016, provisional application No. 62/168,268, filed on May 29, 2015.

(51) Int. Cl.
*B01D 53/22* (2006.01)
*B01D 69/02* (2006.01)
(Continued)

(52) U.S. Cl.
CPC ......... *B01D 53/226* (2013.01); *B01D 53/228* (2013.01); *B01D 69/02* (2013.01);
(Continued)

(58) Field of Classification Search
CPC .................. B01D 69/02; B01D 2257/504; B01D 53/228; B01D 53/226; B01D 2258/0283;
(Continued)

(56) References Cited

U.S. PATENT DOCUMENTS 3,674,022 A * 7/1972 Dounoucos ............ B64D 10/00
128/205.27
4,678,539 A * 7/1987 Tomita ................ C04B 41/5346
204/192.35
(Continued)

FOREIGN PATENT DOCUMENTS

CN 1132658 A 10/1996
CN 102026702 A 4/2011
(Continued)

OTHER PUBLICATIONS

T.C. Merkel, H. Lin, X. Wei, R. Baker, "Power Plant PostCombustion Carbon Dioxide Capture: An Opportunity for Membranes", J. Membr. Sci., 359, 126-139 (2010).
(Continued)

*Primary Examiner* — Anthony R Shumate
(74) *Attorney, Agent, or Firm* — Meunier Carlin & Curfman LLC

(57) ABSTRACT

Disclosed herein are 2-stage membrane separation methods for capturing $CO_2$ from a feed gas. The methods can employ two selectively permeable membranes, which may be the same or different. The selectively permeable membrane can have a carbon dioxide permeance of from 500 to 3000 GPU at 57° C. and 1 atm feed pressure and a carbon dioxide: nitrogen selectivity of from 10 to 1000 at 57° C. and 1 atm feed pressure. High pressure ratios across the membranes can be achieved by compressing the feed gas to a high pressure, by using vacuum pumps to create a lowered pressure on the permeate side of the membrane, by using a sweep stream, or a combination thereof. When a sweep
(Continued)

stream is used, the sweep stream may include a portion of the retentate gas stream obtained from the retentate side of one or more of the membranes used.

19 Claims, 2 Drawing Sheets

(51) Int. Cl.
   *B01D 71/44* (2006.01)
   *C01B 32/50* (2017.01)
(52) U.S. Cl.
   CPC .............. *B01D 71/44* (2013.01); *C01B 32/50* (2017.08); *B01D 2256/22* (2013.01); *B01D 2257/504* (2013.01); *B01D 2258/0283* (2013.01); *B01D 2325/20* (2013.01); *Y02C 20/40* (2020.08); *Y02P 20/151* (2015.11)
(58) Field of Classification Search
   CPC .... B01D 2256/22; B01D 71/44; Y02C 10/10; C01B 32/50; Y02P 20/152
   See application file for complete search history.

(56) References Cited

U.S. PATENT DOCUMENTS

| | | | |
|---|---|---|---|
| 4,963,165 A * | 10/1990 | Blume | B01D 71/80 427/385.5 |
| 5,525,143 A | 6/1996 | Morgan et al. | |
| 5,681,433 A * | 10/1997 | Friesen | B01D 53/22 159/DIG. 27 |
| 5,843,209 A | 12/1998 | Ray et al. | |
| 6,099,621 A * | 8/2000 | Ho | B01D 53/228 264/212 |
| 6,616,735 B1 | 9/2003 | Burban et al. | |
| 6,767,527 B1 * | 7/2004 | Åsen | B01D 53/226 423/437.1 |
| 7,964,020 B2 | 6/2011 | Baker et al. | |
| 8,016,923 B2 | 9/2011 | Baker et al. | |
| 8,025,715 B2 | 9/2011 | Wijmans et al. | |
| 8,277,932 B2 | 10/2012 | Ho | |
| 8,337,587 B2 | 12/2012 | Gearhart et al. | |
| 8,409,324 B1 | 4/2013 | Straub et al. | |
| 8,829,059 B2 * | 9/2014 | Wynn | C07C 29/151 518/705 |
| 9,216,390 B2 | 12/2015 | Ho et al. | |
| 9,546,785 B1 * | 1/2017 | Baker | F23J 15/02 |
| 9,782,718 B1 * | 10/2017 | Baker | B01D 53/02 |
| 2008/0078290 A1 * | 4/2008 | Hagg | B01D 67/0088 95/51 |
| 2008/0112867 A1 * | 5/2008 | Wei | B01J 19/2475 423/224 |
| 2008/0127632 A1 * | 6/2008 | Finkenrath | F02C 1/04 60/274 |
| 2011/0005272 A1 * | 1/2011 | Wijmans | B01D 53/225 62/617 |
| 2011/0201841 A1 * | 8/2011 | Bowman | C07C 17/154 562/520 |
| 2011/0219777 A1 * | 9/2011 | Wijmans | F02C 3/34 60/772 |
| 2011/0219778 A1 * | 9/2011 | Wijmans | B01D 53/62 60/772 |
| 2012/0031833 A1 * | 2/2012 | Ho | B01D 67/0072 210/488 |
| 2012/0272657 A1 * | 11/2012 | Baker | B01D 53/22 60/772 |
| 2013/0058853 A1 * | 3/2013 | Baker | F02C 3/34 423/228 |
| 2013/0200625 A1 * | 8/2013 | Wei | F02C 7/00 290/52 |
| 2014/0005285 A1 * | 1/2014 | Wynn | C07C 29/76 518/705 |
| 2015/0129493 A1 * | 5/2015 | Federspiel | A61M 1/34 210/632 |
| 2016/0248111 A1 * | 8/2016 | Gas | H01M 8/0668 |
| 2017/0183996 A1 * | 6/2017 | Baker | B01D 53/22 |
| 2017/0320009 A1 * | 11/2017 | Hirata | C01B 32/50 |
| 2017/0341017 A1 * | 11/2017 | Dutta | B01D 53/228 |

FOREIGN PATENT DOCUMENTS

| | | |
|---|---|---|
| CN | 102036736 A | 4/2011 |
| WO | 2009139835 A1 | 11/2009 |
| WO | 2009142919 A2 | 11/2009 |
| WO | 2015076859 A1 | 5/2015 |

OTHER PUBLICATIONS

K. Ramasubramanian, H. Verweij, and W. S. W. Ho, "Membrane Processes for Carbon Capture from CoalFired Power Plant Flue Gas: A Modeling and Cost Study", J. Membr. Sci., 10.1016/j.memsci.2012.07.029, 421422, 299-310 (2012). Abstract.

International Search Report and Written Opinion issued for International Application No. PCT/US2016/033757, dated Sep. 30, 2016.

International Preliminary Report on Patentability issued for International Application No. PCT/US2016/033757, dated.

Post Combustion Membranes. Advanced Carbon Dioxide R&D program: Technology Update. May 2013; p. B-378, table 1.

Office Action and Search Report issued by the Chinese State Intellectual Property Administration in Application No. CN201680039626.0 dated Aug. 3, 2020. 22 pages.

Chinese State Intellectual Property Administration. Office Action issued in Application No. CN 201680039626.0 dated Jun. 1, 2021. 8 pages including translation.

\* cited by examiner

METHODS FOR THE SEPARATION OF CO$_2$ FROM A GAS STREAM

CROSS REFERENCE TO RELATED APPLICATIONS

This application claims the benefit of U.S. Provisional Application No. 62/168,268, filed May 29, 2015, and U.S. Provisional Application No. 62/303,938, filed Mar. 4, 2016, both of which are incorporated herein by reference in their entirety.

STATEMENT REGARDING FEDERALLY SPONSORED RESEARCH OR DEVELOPMENT

This invention was made with Government Support under Grant No. DE-FE0007632 awarded by the U.S. Department of Energy, National Energy Technology Laboratory. The Government has certain rights in the invention.

FIELD OF THE DISCLOSURE

This disclosure relates generally to methods for the separation of carbon dioxide from a gas stream.

BACKGROUND OF THE DISCLOSURE

In recent years it has become obvious that the generation of greenhouse gases leads to global warming and that further increase in greenhouse gas production will accelerate global warming. Since CO$_2$ (carbon dioxide) is identified as a main greenhouse gas, CCS (carbon capture and storage) is considered as one of the potential major means to reduce the release of greenhouse gases into the atmosphere and to control global warming. To implement these strategies, improved methods and methods for separating CO$_2$ from flue gas are needed.

SUMMARY OF THE DISCLOSURE

Provided herein are two (2)-stage membrane separation methods for capturing carbon dioxide (CO$_2$) from feed gas stream. The feed gas stream can be from a variety of sources, provided that includes CO$_2$ in combination with one or more additional gases. For example, the feed gas stream can include CO$_2$ in combination with additional gases such as H$_2$, N$_2$, O$_2$, CH$_4$, CO, H$_2$O, SO$_2$, NO, NO$_2$, and combinations thereof. In some cases, the feed gas stream can be a combustion gas, such as a gas stream that includes the combustion products of a hydrocarbon fuel (e.g., the combustion products from coal combustion or the combustion products from natural gas combustion). In certain embodiments, the feed gas can be emissions from a power plant (e.g., a natural gas-fired power plant or a coal-fired power plant). The feed gas can also be a natural gas stream. For example, the methods described herein can be used to remove CO$_2$ from a natural gas stream (e.g., to upgrade CO$_2$). The feed gas can also be, for example, emissions from a cement plant.

The carbon dioxide content of the feed gas stream may vary. In some instances, the feed gas stream can include at least 5 vol % carbon dioxide (e.g., from 5 vol % to 80 vol % CO$_2$, from 5 vol % to 40 vol % CO$_2$, from 5 vol % to 20 vol % CO$_2$, from 5 vol % to 10 vol % CO$_2$, or from 10 vol % to 20 vol % CO$_2$). In certain embodiments, the feed gas stream can include from 14 vol % to 18 vol % CO$_2$ or from 6 vol % to 9 vol % CO$_2$).

The 2-stage membrane separation methods can employ a first selectively permeable membrane and second selectively membrane arranged in series. The first selectively permeable membrane and second selectively membrane can be the same or different. The selectively permeable membranes can have a carbon dioxide permeance of at least 500 gas permeance units (GPU), such as from 500 to 3000 GPU at 57° C. and 1 atm feed pressure. In some examples, the selectively permeable membranes can have a high carbon dioxide permeance and a moderate carbon dioxide:nitrogen selectivity. For example, the selectively permeable membranes can have a carbon dioxide permeance of from 1000 to 3000 GPU at 57° C. and 1 atm feed pressure (e.g., a carbon dioxide permeance of from 1500 to 2500 GPU at 57° C. and 1 atm feed pressure) and a carbon dioxide:nitrogen selectivity of from 10 to 60 at 57° C. and 1 atm feed pressure. In one embodiment, the selectively permeable membranes can have a carbon dioxide permeance of about 2000 GPU at 57° C. and 1 atm feed pressure and a carbon dioxide:nitrogen selectivity of about 20 at 57° C. and 1 atm feed pressure. In these cases, the selectively permeable membranes can comprise a polymer layer that includes an amine-containing polymer, a polyalkylene oxide, a polyalkyl siloxane, a copolymer thereof, or a blend thereof. For example, the polymer layer can comprise polyvinylamine, polyethylene oxide, polydimethylsiloxane, or a combination thereof.

The selectively permeable membrane can have a carbon dioxide:nitrogen selectivity of at least 10 at 57° C. and 1 atm feed pressure, such as from 10 to 1000 at 57° C. and 1 atm feed pressure. In some examples, the selectively permeable membranes can have a high carbon dioxide:nitrogen selectivity and a moderate or high carbon dioxide permeance. For example, the selectively permeable membrane can have a carbon dioxide:nitrogen selectivity of from 50 to 1000 at 57° C. and 1 atm feed pressure (e.g., a carbon dioxide:nitrogen selectivity of from 100 to 500 at 57° C. and 1 atm feed pressure) and a carbon dioxide permeance of from 500 to 2500 GPU at 57° C. (e.g., a carbon dioxide permeance of from 1500 to 2500 GPU at 57° C. and 1 atm feed pressure). In one embodiment, the selectively permeable membranes can have a carbon dioxide permeance of about 1100 GPU at 57° C. and 1 atm feed pressure and a carbon dioxide:nitrogen selectivity of about 140 at 57° C. and 1 atm feed pressure. In one embodiment, the selectively permeable membranes can have a carbon dioxide permeance of about 1100 GPU at 57° C. and 1 atm feed pressure and a carbon dioxide:nitrogen selectivity of about 140 at 57° C. and 1 atm feed pressure. In these cases, the selectively permeable membranes can comprise a selective polymer layer comprising an amine-containing polymer chosen from polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof. For example, the amine-containing polymer can comprise polyvinylamine. In certain cases, a mobile carrier, such as an aminoacid salt, can be dispersed within the amine-containing polymer.

Optionally, a driving force for transmembrane permeation can be supplied by lowering the partial pressure of the carbon dioxide permeant on the permeate side of the membrane, to a level below its partial pressure on the feed side. High pressure ratios across the membranes can be achieved by compressing the gas to a high pressure on the retentate side, by using vacuum pumps to create a lowered pressure on the permeate side, or a combination of both. In some embodiments, the feed gas stream can be compressed prior to passing the feed stream through any one of the selectively permeable membrane. For example, the initial (raw) feed gas stream and/or the first permeate stream can be compressed to a pressure of 1.5 atm or greater, such as from 1.5 to 2.5 atm or from 1.5 to 4 atm, prior to passing the teed stream through the selectively permeable membrane.

When a vacuum is used, the vacuum can be pulled at the permeate side of the selectively permeable membrane. In some cases, the vacuum is pulled at the permeate side of the selectively permeable membrane having a relatively high $CO_2:N_2$ selectivity. The relatively high $CO_2:N_2$ selectivity of the membranes employed in the methods described herein can allow one to apply a large pressure ratio to obtain a high $CO_2$ removal as well as a high $CO_2$ purity in only one step (i.e., using a single membrane). In some embodiments, a vacuum can be applied to generate a pressure of from 0.1 to 0.5 atm on the permeate side of the selectively permeable membrane having a relatively high $CO_2:N_2$ selectivity. In some embodiments, the feed pressure to permeate pressure ratio can be at least 5 (e.g., from 5 to 40, from 5 to 20, or from 5 to 10). In certain embodiments, the feed pressure to permeate pressure ratio can be at least 7 (e.g., from 7 to 40, from 7 to 20, or from 7 to 10).

Optionally, a sweep gas can be used to provide a low carbon dioxide partial pressure on the permeate side of selectively permeable membrane, thereby providing or augmenting the driving force for transmembrane permeation. When a sweep gas is used, the sweep gas can include air, oxygen-enriched air, oxygen, nitrogen, nitrogen-enriched air, steam, or combinations thereof. In other embodiments, the sweep gas can include a portion of the retentate gas stream obtained from one or more of the other selectively permeable membranes used during separation.

The carbon dioxide content of the carbon dioxide-depleted product gas stream (the first or second permeate stream) may vary depending upon method requirements. In some embodiment, the carbon dioxide-depleted product gas stream can include 5 vol % or less carbon dioxide. For example, the carbon dioxide-depleted product gas stream can include 2 vol % or less carbon dioxide, 1.5 vol % or less carbon dioxide, 1 vol % or less carbon dioxide, 0.75 vol % or less carbon dioxide, or 0.5 vol % or less carbon dioxide.

In some embodiments of the 2-stage methods described herein, the feed gas stream passes through a first selectively permeable membrane having a retentate side and an opposing permeate side to separate the feed gas stream into a first retentate stream and a first permeate stream. The first permeate stream then passes through a second selectively permeable membrane having a retentate side and an opposing permeate side to separate the first permeate stream into a second retentate stream and a second permeate stream. The method can include passing a sweep gas comprising the first retentate stream, the second retentate stream, or a combination thereof across the permeate side of the first selectively permeable membrane. The $CO_2$-containing second permeate stream, having a greater concentration of carbon dioxide than the feed gas stream, can then be withdrawn.

In some of these embodiments, the first selectively permeable membrane and the second selectively permeable membrane can each exhibit a carbon dioxide permeance of at least 500 GPU at 57° C. and 1 atm feed pressure (e.g., from 500 to 3000 GPU at 57° C. and 1 atm feed pressure, or from 1000 to 1500 GPU at 57° C. and 1 atm feed pressure) and a carbon dioxide:nitrogen selectivity of from 10 to 1000 at 57° C. and 1 atm feed pressure (e.g., from 50 to 1000 at 57° C. and 1 atm feed pressure, or from 100 to 500 at 57° C. and 1 atm feed pressure).

In other embodiments of the 2-stage methods described herein, the feed gas stream passes through a first selectively permeable membrane having a retentate side and an opposing permeate side to separate the feed gas stream into a first retentate stream and a first permeate stream. The first selectively permeable membrane can have a relatively high carbon dioxide permeance, such as at least 1000 GPU at 57° C. and 1 atm feed pressure and a relatively modest carbon dioxide:nitrogen selectivity, such as at least 10 at 57° C. and 1 atm feed pressure. The first permeate stream then passes through a second selectively permeable membrane having a retentate side and an opposing permeate side to separate the first permeate stream into a second retentate stream and a second permeate stream. The $CO_2$-containing second permeate stream, having a greater concentration of carbon dioxide than the feed gas stream, can then be withdrawn.

In some of these embodiments, the first selectively permeable membrane can exhibit a carbon dioxide permeance of at least 1000 GPU at 57° C. and 1 atm teed pressure (e.g., from 1000 to 3000 GPU at 57° C. and 1 atm feed pressure, or from 1500 to 2500 GPU at 57° C. and 1 atm feed pressure) and a carbon dioxide:nitrogen selectivity of at least 10 at 57° C. and 1 atm feed pressure (e.g., from 10 to 60 at 57° C. and 1 atm feed pressure, or from 15 to 40 at 57° C. and 1 atm feed pressure). In some of these embodiments, the second selectively permeable membrane can exhibit a carbon dioxide permeance of at least 500 GPU at 57° C. and 1 atm feed pressure (e.g., from 500 to 3000 GPU at 57° C. and 1 atm feed pressure, or from 1000 to 1500 CPU at 57° C. and 1 atm feed pressure) and a carbon dioxide:nitrogen selectivity of from 10 to 1000 at 57° C. and 1 atm feed pressure (e.g., from 50 to 1000 at 57° C. and 1 atm feed pressure, or from 100 to 500 at 57° C. and 1 atm feed pressure).

In other embodiments of the 2-stage methods described herein, the feed gas stream passes through a first selectively permeable membrane having a retentate side and an opposing permeate side to separate the feed gas stream into a first retentate stream and a first permeate stream. The first permeate stream then passes through a second selectively permeable membrane having a retentate side and an opposing permeate side to separate the first permeate stream into a second retentate stream and a second permeate stream. In these embodiments, the second selectively permeable membrane can have a relatively high carbon dioxide:nitrogen selectivity, such as at least 50 at 57° C. and 1 atm feed pressure and a relatively modest carbon dioxide permeance, such as at least 500 GPU at 57° C. and 1 atm feed pressure. The $CO_2$-containing second permeate stream, having a greater concentration of carbon dioxide than the feed gas stream, can then be withdrawn.

In some of these embodiments, the first selectively permeable membrane can exhibit a carbon dioxide permeance of at least 1000 GPU at 57° C. and 1 atm feed pressure (e.g., from 1000 to 3000 GPU at 57° C. and 1 atm feed pressure, or from 1500 to 2500 GPU at 57° C. and 1 atm feed pressure) and a carbon dioxide:nitrogen selectivity of at least 10 at 57° C. and 1 atm feed pressure (e.g., from 10 to 60 at 57° C. and 1 atm feed pressure, or from 15 to 40 at 57° C. and 1 atm feed pressure). In some of these embodiments, the second selectively permeable membrane can exhibit a carbon dioxide permeance of at least 500 GPU at 57° C. and 1 atm feed pressure (e.g., from 500 to 3000 GPU at 57° C. and 1 atm feed pressure, or from 1000 to 1500 GPU at 57° C. and 1 atm feed pressure) and a carbon dioxide:nitrogen selectivity of from 10 to 1000 at 57° C. and 1 atm feed pressure (e.g., from 50 to 1000 at 57° C. and 1 atm teed pressure, or from 100 to 500 at 57° C. and 1 atm feed pressure).

In still further embodiments of the 2-stage methods described herein, the feed gas stream passes through a first selectively permeable membrane having a retentate side and an opposing permeate side to separate the feed gas stream into a first retentate stream and a first permeate stream. The first permeate stream then passes through a second selectively permeable membrane having a retentate side and an opposing permeate side to separate the first permeate stream into a second retentate stream and a second permeate stream. The method can include applying a vacuum to the permeate side of the second selectively permeable membrane. The vacuum can be applied to generate a pressure of from 0.1 to 0.5 atm on the permeate side of the second selectively permeable membrane. The $CO_2$-containing second permeate stream, having a greater concentration of carbon dioxide than the feed gas stream, can then be withdrawn.

In some of these embodiments, the first selectively permeable membrane can exhibit a carbon dioxide permeance of at least 1000 GPU at 57° C. and 1 atm teed pressure (e.g., from 1000 to 3000 GPU at 57° C. and 1 atm feed pressure, or from 1500 to 2500 GPU at 57° C. and 1 atm feed pressure) and a carbon dioxide:nitrogen selectivity of at least 10 at 57° C. and 1 atm feed pressure (e.g., from 10 to 60 at 57° C. and 1 atm feed pressure, or from 15 to 40 at 57° C. and 1 atm feed pressure). In some of these embodiments, the second selectively permeable membrane can exhibit a carbon dioxide permeance of at least 500 GPU at 57° C. and 1 atm feed pressure (e.g., from 500 to 3000 GPU at 57° C. and 1 atm feed pressure, or from 1000 to 1500 GPU at 57° C. and 1 atm feed pressure) and a carbon dioxide:nitrogen selectivity of from 10 to 1000 at 57° C. and 1 atm feed pressure (e.g., from 50 to 1000 at 57° C. and 1 atm feed pressure, or from 100 to 500 at 57° C. and 1 atm feed pressure).

In another embodiment of the 2-stage methods described herein, the feed gas stream passes through a first selectively permeable membrane having a retentate side and an opposing permeate side to separate the feed gas stream into a first retentate stream and a first permeate stream. In these embodiments, the first selectively permeable membrane can have a relatively high carbon dioxide:nitrogen selectivity, such as at least 50 at 57° C. and 1 atm feed pressure and a relatively modest carbon dioxide permeance, such as at least 500 GPU at 57° C. and 1 atm feed pressure. The first permeate stream can contain 90 vol % or greater $CO_2$ on dry basis. The $CO_2$-containing first permeate stream, having a greater concentration of carbon dioxide than the feed gas stream, can then be withdrawn. The first retentate stream then passes through a second selectively permeable membrane having a retentate side and an opposing permeate side to separate the first permeate stream into a second retentate stream and a second permeate stream. In these embodiments, the second selectively permeable membrane can have a relatively high carbon dioxide permeance, such as at least 1000 GPU at 57° C. and a relatively modest carbon dioxide:nitrogen selectivity, such as at least 10 at 57° C. The method can include passing an air sweep gas across the permeate side of the second selectively permeable membrane. The $CO_2$-containing second permeate stream with the sweep air can be returned to a combustor to form a part of the feed gas stream.

In some of these embodiments, the first selectively permeable membrane can exhibit a carbon dioxide permeance of at least 500 GPU at 57° C. and 1 atm feed pressure (e.g., from 500 to 3000 GPU at 57° C. and 1 atm teed pressure, or from 1000 to 1500 GPU at 57° C. and 1 atm feed pressure) and a carbon dioxide:nitrogen selectivity of from 10 to 1000 at 57° C. and 1 atm feed pressure (e.g., from 50 to 1000 at 57° C. and 1 atm feed pressure, or from 100 to 500 at 57° C. and 1 atm feed pressure). In some of these embodiments, the second selectively permeable membrane can exhibit a carbon dioxide permeance of at least 1000 GPU at 57° C. and 1 atm feed pressure (e.g., from 1000 to 3000 GPU at 57° C. and 1 atm feed pressure, or from 1500 to 2500 GPU at 57° C. and 1 atm feed pressure) and a carbon dioxide:nitrogen selectivity of at least 10 at 57° C. and 1 atm feed pressure (e.g., from 10 to 60 at 57° C. and 1 atm feed pressure, or from 15 to 40 at 57° C. and 1 atm feed pressure).

DETAILED DESCRIPTION

Figure 1:
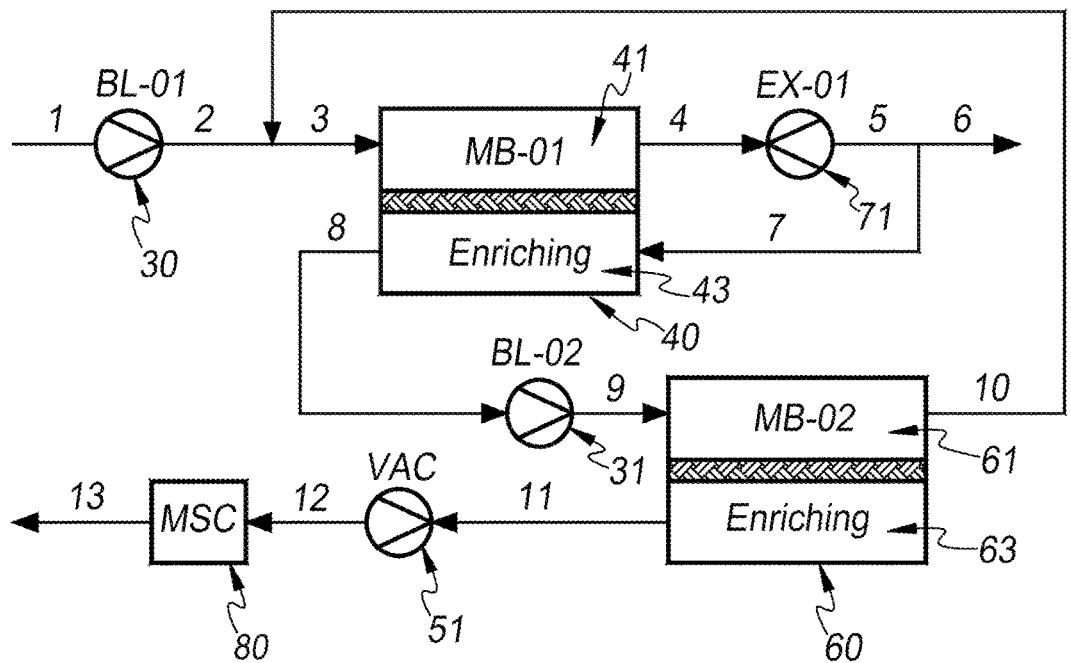
FIG. 1 is a flow diagram of an exemplary 2-stage hybrid membrane method (retentate recycle; EC1R1S).

Provided herein are membrane separation methods for separating carbon dioxide from a feed gas stream. The feed gas stream can contain carbon dioxide and other constituents such as water, nitrogen, oxygen, hydrogen, a natural gas, and hydrogen sulfide. Such a feed gas stream may come from any of a number of sources. In some instances, the feed gas stream for separation may be derived from a fossil fuel that requires hydrogen purification for fuel cell, electricity generation, and hydrogenation applications, a biogas for renewable energy, or a natural gas for commercial uses. The gas stream may also be derived from a flue gas for removal of carbon dioxide from the flue gas. In some examples, the feed gas stream can be derived from a cement plant, a natural gas plant, or a coal plant.

Depending on the source, the carbon dioxide content of the feed gas stream may vary. In some embodiments, the feed gas stream can include 5 vol % or greater carbon dioxide. For example, the teed gas stream can include 10 vol % or greater carbon dioxide, 15 vol % or greater carbon dioxide, 20 vol % or greater carbon dioxide, 25 vol % or greater carbon dioxide, 30 vol % or greater carbon dioxide, 35 vol % or greater carbon dioxide, 40 vol % or greater carbon dioxide, 45 vol % or greater carbon dioxide, 50 vol % or greater carbon dioxide, 55 vol % or greater carbon dioxide, 60 vol % or greater carbon dioxide, 65 vol % or greater carbon dioxide, 70 vol % or greater carbon dioxide, 75 vol % or greater carbon dioxide, 80 vol % or greater carbon dioxide, 85 vol % or greater carbon dioxide, or 90 vol % or greater carbon dioxide. In some instances, the feed gas stream can include from 5 vol % to 80 vol % $CO_2$ (e.g., from 5 vol % to 40 vol % $CO_2$, from 5 vol % to 20 vol % $CO_2$, from 5 vol % to 10 vol % $CO_2$, or from 10 vol % to 20 vol % $CO_2$). In certain embodiments, the feed gas stream can include from 14 vol % to 18 vol % $CO_2$ or from 6 vol % to 9 vol % $CO_2$).

The gas feed streams described herein may be available at atmospheric pressure, such as a flue gas stream. Therefore, the methods described herein are sufficiently flexible to be used with gas feed streams having optimum pressure, low pressure, or high pressure. In some embodiments, compression of the feed gas stream, such as from atmospheric pressure to a pressure of 1.5 atm or greater, 2 atm or greater, 2.5 atm or greater, 3 atm or greater, 3.5 atm or greater, 4 atm or greater, 4.5 atm or greater, or 5 atm or greater can provide part of the carbon dioxide separation method that is relatively energy efficient. In certain embodiments, the feed gas stream can be compressed to a pressure of from 1.5 to 2.5 atm, from 1.5 to 3 atm, from 1.5 to 4 atm, from 1.5 to 5 atm, or from 3 to 5 atm.

The feed gas stream along with air, oxygen enriched air or oxygen can be introduced into a combustor prior carrying out the membrane separation methods described herein. The combustion off-gas stream can then be processed as described herein.

Membranes

The membrane separation methods described herein can employ at least two membranes. In one embodiment, the at least two membranes comprise a first stage membrane and a second stage membrane. Each membrane can independently introduce a specific characteristic to the separation method. Thus, by providing two membranes, one can change the characteristics or properties (such as purity) of the separated gases in a way not seen by simply using a single membrane. The at least two membranes used in the methods described herein can be the same. In some embodiments, the at least two membranes can be different. When the membranes are different, the membranes can be arranged in any order, or for example as described herein.

In some embodiments, the at least two membranes can include a first selectively permeable membrane and a second selectively permeable membrane. Selectively permeable membranes are disclosed in PCT/US2015/041282 and U.S. Pat. No. 8,277,932, both of which are hereby incorporated herein by reference. The selectively permeable membrane can have a $CO_2$:$N_2$ selectivity of at least 10 at 57° C. and 1 atm feed pressure. For example, the selectively permeable membrane can have a $CO_2$:$N_2$ selectivity of at least 25 at 57° C. and 1 atm feed pressure (e.g., at least 50, at least 75, at least 100, at least 150, at least 200, at least 250, at least 300, at least 350, at least 400, at least 500, at least 600, at least 700, at least 800, at least 900, or at least 1000) at 57° C. and 1 atm feed pressure. In some embodiments, the selectively permeable membrane can have a $CO_2$:$N_2$ selectivity of 1000 or less at 57° C. and 1 atm feed pressure (e.g., 900 or less, 800 or less, 700 or less, 500 or less, 400 or less, 300 or less, 200 or less, 100 or less, 80 or less, 60 or less, or 50 or less) at 57° C. and 1 atm feed pressure.

The selectively permeable membrane can have a $CO_2$:$N_2$ selectivity ranging from any of the minimum values described above to any of the maximum values described above. For example, the selectively permeable membrane can have a $CO_2$:$N_2$ selectivity of from 10 to 1000 (e.g., from 10 to 500, from 10 to 100, from 10 to 60, from 50 to 1000, from 50 to 500, from 100 to 1000, or from 100 to 500) at 57° C. and 1 atm feed pressure. The $CO_2$:$N_2$ selectivity of the selectively permeable membrane is defined as the ratio of $CO_2$ permeance to $N_2$ permeances. The $CO_2$ permeance and $N_2$ permeance of the selectively permeable membrane can be measured using standard methods for measuring gas permeance known in the art, such as those described in ASTM D1434-82 (2015), which is incorporated herein by reference.

The selectively permeable membrane can have a $CO_2$ permeance of at least 500 GPU at 57° C. and 1 atm feed pressure. For example, the selectively permeable membrane can have a $CO_2$ permeance of 750 GPU or greater (e.g., 1000 GPU or greater, 1500 GPU or greater, 2000 GPU or greater, 2500 GPU or greater, or 3000 GPU or greater) at 57° C. and 1 atm feed pressure. In some embodiments, the selectively permeable membrane can have a $CO_2$ permeance of 3000 GPU or less (e.g., 2500 GPU or less, 2000 GPU or less, or 1500 GPU or less) at 57° C. and 1 atm feed pressure.

The selectively permeable membrane can have a $CO_2$ permeance ranging from any of the minimum values described above to any of the maximum values described above. For example, the selectively permeable membrane can have a $CO_2$ permeance of from 500 to 3000 GPU (e.g., from 500 to 2500 GPU, from 1000 to 3000 CPU, from 1000 to 2500 GPU, from 1500 to 3000 GPU, from 1500 to 2500 GPU, or from 2000 to 3000 GPU) at 57° C. and 1 atm feed pressure. The $CO_2$ permeance of the selectively permeable membrane can be measured using standard methods for measuring gas permeance known in the art, such as those described in ASTM D1434-82 (2015) which is incorporated herein by reference.

In some embodiments, the selectively permeable membrane can have a relatively high $CO_2$:$N_2$ selectivity and a relatively moderate $CO_2$ permeance. For example, the selectively permeable membrane can have a $CO_2$:$N_2$ selectivity of from 50 or greater and a $CO_2$ permeance of 500 GPU or greater at 57° C. and 1 atm feed pressure (e.g., a $CO_2$:$N_2$ selectivity of from 50 to 1000 at 57° C. and 1 atm feed pressure and a $CO_2$ permeance of from 500 to 2500 GPU at 57° C. and 1 atm feed pressure).

In some embodiments, the selectively permeable membrane can have a relatively high $CO_2$ permeance and a relatively low $CO_2$:$N_2$ selectivity. For example, the selectively permeable membrane can have a $CO_2$ permeance of from 1000 GPU or greater and a $CO_2$:$N_2$ selectivity of 10 or greater at 57° C. and 1 atm feed pressure (e.g., a $CO_2$ permeance of from 1000 to 3000 GPU at 57° C. and a $CO_2$:$N_2$ selectivity of from 10 to 60 at 57° C. and 1 atm feed pressure).

The components in the selectively permeable membrane can vary depending on the permeability and selectivity required for a particular application. In some embodiments, the selectively permeable membrane can include one or more layers (e.g., one or more polymer layers). In some embodiments, the membranes can be derived from an amine-based polymer, a polyethyleneoxide (PEO)-based polymer, a polydimethylsiloxane (PDMS)-based polymer, or a combination thereof. In some instances, the membrane can include a selective polymer (a selective polymer layer) through which gas permeates via diffusion or facilitated diffusion.

Examples of suitable membranes are described, for example, in International Application No. PCT/US2015/041282, U.S. Pat. Nos. 9,216,390, and 8,277,932, each of which are hereby incorporated herein by reference in their entirety. In certain embodiments, the membranes can comprise a gas permeable support layer, an inorganic layer disposed on the gas permeable support layer, and a selective polymer layer disposed on the inorganic layer. In these embodiments, the gas permeable support layer, the inorganic layer, and the selective polymer layer can optionally comprise one or more sub-layers.

The gas permeable support layer can be formed from any suitable material. The material used to form the gas permeable support layer can be chosen based on the end use application of the membrane. In some embodiments, the gas permeable support layer can comprise a gas permeable polymer. The gas permeable polymer can be a cross-linked polymer, a phase separated polymer, a porous condensed polymer, or a blend thereof. Examples of suitable gas permeable polymers include polyamides, polyimides, polypyrrolones, polyesters, sulfone-based polymers, polymeric organosilicones, fluorinated polymers, polyolefins, copolymers thereof, or blends thereof. Specific examples of polymers in the gas permeable support layer can include polydimethylsiloxane, polydiethylsiloxane, polydi-isopropylsiloxane, polydiphenylsiloxane, polyethersulfone, polyphenylsulfone, polysulfone, partially fluorinated or perfluorinated derivatives thereof, copolymers thereof, or blends thereof. In some embodiments, the gas permeable polymer can be polyethersulfone. If desired, the gas permeable support layer can include inorganic particles to increase the mechanical strength without altering the permeability of the support layer.

In certain embodiments, the gas permeable support layer can comprise a gas permeable polymer disposed on a base. The base can be in any configuration configured to facilitate formation of a membrane suitable for use in a particular application. For example, the base can be a flat disk, a tube, a spiral wound, or a hollow fiber base. The base can be formed from any suitable material. In some embodiments, the layer can include a fibrous material. The fibrous material in the base can be a mesh (e.g., a metal or polymer mesh), a woven or non-woven fabric, a glass, fiberglass, a resin, a screen (e.g., a metal or polymer screen). In certain embodiments, the base can include a non-woven fabric (e.g., a non-woven fabric comprising fibers formed from a polyester.

The inorganic layer can be formed from a variety of suitable materials. In certain embodiments, the inorganic layer can be formed from a plurality of discreet nanoparticles having an average particle size of less than 1 micron. The inorganic layer can comprise multiple pores and/or channels formed between the nanoparticles and/or within the nanoparticles. The pores and/or channels formed can be in fluid contact with the gas permeable support layer. The nanoparticles can be selected to have a surface chemistry that is compatible with the selective polymer layer, the gas permeable support layer, or a combination thereof. For example, in certain cases, the nanoparticle can comprise hydrophilic nanoparticles. Examples of suitable nanoparticles include alkaline earth metal oxide nanoparticles, transition metal oxide nanoparticles, lanthanide metal oxide nanoparticles, group IVA metal oxide nanoparticles, transition metal nanoparticles, transition-metal catalyst nanoparticles, nanoparticles comprising a transition metal adsorbed on a non-reactive support, metal alloy nanoparticles, silicate nanoparticles, alumino-silicate nanoparticles, nanoparticles comprising clays, and combinations thereof. Specific examples of nanoparticles include alumina nanoparticles, silica nanoparticles, zeolite nanoparticles, titania nanoparticles, zirconia nanoparticles, palladium nanoparticles, platinum nanoparticles, nickel nanoparticles, transition-metal catalyst nanoparticles, and combinations thereof. In certain embodiments, the nanoparticles in the inorganic layer can be chosen from silicate nanoparticles, alumino-silicate nanoparticles, or combinations thereof. In certain embodiments, the nanoparticles can comprise zeolite nanoparticles. The zeolite nanoparticles can comprise zeolites having varying frameworks and differing Si/Al rations. For example, the nanoparticles can be zeolite Y nanoparticles.

The membranes can further include a selective polymer layer disposed on the inorganic layer. In some cases, the selective polymer layer can be a selective polymer through which gas permeates via diffusion or facilitated diffusion. The selective polymer layer can include a hydrophilic polymer, an amino compound, or a combination thereof. In some embodiments, the hydrophilic polymer can be absent. In other embodiments, the polymer can comprise a combination of a hydrophilic polymer and an amino compound. For example, the polymer can comprise an amino compound (e.g., a small molecule or a polymer) dispersed in a hydrophilic polymer matrix.

The amino compound (e.g., a small molecule or a polymer) in the polymer can have one or more primary amine moieties and/or one or more secondary amine moieties. The amino compound can be, for example, an amine-containing polymer, a low molecular weight amino compound (i.e., a small molecule), or a combination thereof.

In some embodiments, the amino compound comprises an amine-containing polymer (also referred to herein as a "fixed carrier"). The amine-containing polymer can have any suitable molecular weight. For example, the amine-containing polymer can have a weight average molecular weight of from 5,000 Da to 2,000,000 Da, 50,000 Da to 2,000,000 Da, or from 50,000 Da to 200,000 Da. Suitable examples of amine-containing polymers include, but are not limited to, polyvinylamine, polyallyl amine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof. In some embodiments, the amine-containing polymer can comprise polyvinylamine (e.g., polyvinylamine having a weight average molecular weight of from 50,000 Da to 2,000,000 Da, from 50,000 Da to 200,000 Da, or from 50,000 Da to 100,000 Da). In some embodiments when the amino compound comprises an amine-containing polymer, the hydrophilic polymer is absent. In some embodiments when the amino compound comprises an amine-containing polymer, the polymer can comprise a blend of an amine-containing polymer and a hydrophilic polymer (e.g., an amine-containing polymer dispersed in a hydrophilic polymer matrix).

In some embodiments, the amino compound can comprise a low molecular weight amino compound (also referred to herein as a "mobile carrier"). Without wishing to be bound by theory, for the facilitated transport mechanism, the $CO_2$ transport of the fixed carrier may be limited by the mobility of the $CO_2$-carrier complex. Therefore, the incorporation of mobile carriers can enhance the $CO_2$ transport. With the incorporation of mobile carriers in the polymer, a higher mobile carrier amount can result in higher $CO_2$ permeance. However, in some embodiments, if the mobile carrier amount is too much, the polymer showed an unstable result. The reason was that the polymer matrix was not strong enough to hold too much amount of mobile carriers. In another words, there might be carrier leakage into the pores of the substrate, which caused the instability of the polymer performance. In some embodiments, the polymer can include up to 65 wt % of the mobile carrier.

The low molecular weight amino compound can have a molecular weight of 1,000 Da or less (e.g., 800 Da or less, 500 or less, 300 Da or less, or 250 Da or less). In some embodiments, the low molecular weight amino compound can be non-volatile at the temperatures at which the polymer will be stored or used. For example, the low molecular weight amino compound can comprise a salt of a primary amine or a salt of a secondary amine. In some embodiments when the amino compound comprises a low molecular weight amino compound, the polymer can comprise a blend of the low molecular weight amino compound and a hydrophilic polymer (e.g., a low molecular weight amino compound dispersed in a hydrophilic polymer matrix).

In some cases, the low molecular weight amino compound can include an aminoacid salt having the formula:

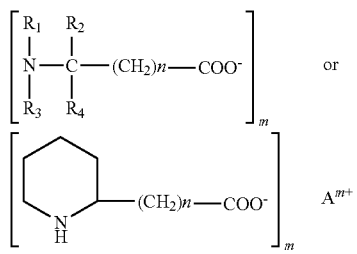

wherein $R_1$, $R_2$, $R_3$, and $R_4$ are hydrogen or hydrocarbon groups having from 1 to 4 carbon atoms, n is an integer ranging from 0 to 4, $A^{m+}$ is a cation having a valence of 1 to 3. In some cases, the cation ($A^{m+}$) can be an amine cation having the formula:

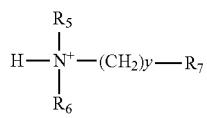

wherein $R_5$ and $R_6$ are hydrogen or hydrocarbon groups having from 1 to 4 carbon atoms, $R_7$ is hydrogen or hydrocarbon groups having from 1 to 4 carbon atoms or an alkyl amine of from 2 to 6 carbon atoms and 1 to 4 nitrogen atoms, y is an integer ranging from 1 to 4, and m is an integer equal to the valence of the cation. In some embodiments, $A^{m+}$ is a metal cation selected from Groups Ia, IIa, and IIIa of the Periodic Table of Elements or a transition metal. For example, $A^{m+}$ can comprise lithium, aluminum, or iron.

Other suitable low molecular weight amino compounds include aminoisobutyric acid-potassium salt, aminoisobutyric acid-lithium salt, aminoisobutyric acid-piperazine salt, glycine-potassium salt, glycine-lithium salt, glycine-piperazine salt, dimethylglycine-potassium salt, dimethylglycine-lihium salt, dimethylglycine-piperazine salt, piperadine-2-carboxlic acid-potassium salt, piperadine-2-carboxlic acid-lithium salt, piperadine-2-carboxlic acid-piperazine salt, piperadine-4-carboxlic acid-potassium salt, piperadine-4-carboxlic acid-lithium salt, piperadine-4-carboxlic acid-piperazine salt, piperadine-3-carboxlic acid-potassium salt, piperadine-3-carboxlic acid-lithium salt, piperadine-3-carboxlic acid-piperazine salt, and blends thereof.

The polymer can comprise any suitable amount of the amino compound. For example, in some embodiments, the hydrophilic polymer can be absent. In these embodiments, the polymer can comprise from 100% to 80% by weight amino compound, based on the total weight of the polymer. In some cases, the polymer can comprise from 10% to 90% by weight (e.g., from 10% to 50% by weight) amino compound, based on the total weight of the components used to form the polymer.

Optionally, the polymer can include any suitable hydrophilic polymer. Examples of hydrophilic polymers suitable for use in the polymer layer can include polyvinylalcohol, polyvinylacetate, a polyalkylene oxide such as polyethylene oxide, polyvinylpyrrolidone, a polyalkyl siloxane such as polydimethylsiloxane, polyacrylamine, a polyamine such as polyallylamine, polyvinyl amine, or polyethylenimine, copolymers thereof, and blends thereof. In some embodiments, the hydrophilic polymer includes polyvinylalcohol.

When present, the hydrophilic polymer can have any suitable molecular weight. For example, the hydrophilic polymer can have a weight average molecular weight of from 15,000 Da to 2,000,000 Da (e.g., from 50,000 Da to 200,000 Da). In some embodiments, the hydrophilic polymer can include polyvinylalcohol having a weight average molecular weight of from 50,000 Da to 150,000 Da.

The polymer can comprise any suitable amount of the hydrophilic polymer. For example, in some cases, the polymer layer can comprise from 10% to 90% by weight (e.g., from 10% to 50% by weight) hydrophilic polymer, based on the total weight of the components used to form the polymer layer.

In some embodiments, the polymer can also include a cross-linking agent. Cross-linking agents suitable for use in the polymer can include, but are not limited to, formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof. In some embodiments, the cross-linking agent can comprise formaldehyde, glutaraldehyde, or maleic anhydride. The polymer can comprise any suitable amount of the cross-linking agent. For example, the polymer can comprise 1 to 40 percent cross-linking agents by weight of the polymer.

The polymer layer can further include a base. The base can act as a catalyst to catalyze the cross-linking of the polymer layer (e.g., cross-linking of a hydrophilic polymer with an amine-containing polymer). In some embodiments, the base can remain in the polymer and constitute a part of the polymer. Examples of suitable bases include potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof. In some embodiments, the base can include potassium hydroxide. The polymer can comprise any suitable amount of the base. For example, the polymer can comprise 1 to 40 percent base by weight of the polymer If desired, the polymer layer can be surface modified by, for example, chemical grafting, blending, or coating to improve the performance of the polymer layer. For example, hydrophobic components may be added to the polymer layer to alter the properties of the polymer layer in a manner that facilitates greater fluid selectivity.

As an example, the membrane can include a high molecular weight polyvinylamine (PVAm) that can act as a fixed carrier, while different kinds of aminoacid salts can be incorporated as mobile carriers in the coating solution for membrane synthesis. The viscous polyvinylamine/mobile carrier coating solution can be knife-coated onto the different substrates to form a thin layer of the membranes synthesized. As the fixed-carrier in the membrane, PVAm not only provides amino groups for $CO_2:N_2$ separation, but also provides the mechanical strength and film-forming ability of the membrane. Therefore, a higher molecular weight of PVAm may be beneficial. Without wishing to be bound by theory, a higher molecular weight may be suitable since the polymer matrix will be stronger, which makes the membrane more stable. Further, due to the stronger polymer matrix, the polymer can allow more mobile carriers to be incorporated into the polymer solution, which can further improve the transport performance. Third, a higher viscosity of the casting solution can be obtained with a higher molecular weight of PVAm, which can reduce the penetration of polymer solution into the substrate, resulting in less mass transfer resistance and higher $CO_2$ permeance. Moreover, thinner membranes can be obtained from the solution with a low concentration and a high viscosity, which will lead to a higher $CO_2$ permeance.

In addition to the polymer, the membranes described herein can further comprise a gas permeable support layer and an inorganic layer disposed on the gas permeable support layer as described in PCT/US2015/041282.

Sweep Gas

As described herein, the driving force for transmembrane separation may be provided or augmented by using a sweep on the permeate side of the membrane. This driving force can provide an improvement in the separation achieved in this step, as well as a reduction in energy consumption. The methods can employ a sweep gas with/without additional compression. Particularly, the sweep gas can reduce the partial pressure of carbon dioxide on the permeate side of a membrane, thereby no excessive feed compression or vacuum are may be necessary to supply the transmembrane driving force. Accordingly, the methods described herein include separation methods that include or exclude a sweep gas, as will be described below with respect to FIGS. 1-4. When a sweep gas is used, the sweep gas can include air, oxygen-enriched air, oxygen, nitrogen, nitrogen-enriched air, steam, or combinations thereof. In some embodiments, the sweep gas can include a portion of the retentate gas stream obtained from the one or more of the membranes used during separation.

The methods described herein can employ a vacuum at the permeate side of the membrane to provide or augmented the transmembrane driving force. In these embodiments, the method can include or exclude a sweep gas. The vacuum can be applied to generate a pressure of 0.5 atm or less (e.g. 0.4 atm or less, 0.3 atm of less, or 0.2 atm or less, such as from 0.1 to 0.5 atm, from 0.1 to 0.3 atm, or from 0.1 to 0.2 atm) on the permeate side of the first selectively permeable membrane. The feed pressure to permeate pressure ratio can (whether including or excluding a sweep gas or a vacuum) can be 7 or greater, such as 10 or greater, 15 or greater, 2.0 or greater, 25 or greater, 30 or greater, 35 or greater, or 40 or greater.

The retentate stream from the 2-stage membrane separation methods is depleted in carbon dioxide and can be discharged from the method, n some embodiments, the methods described herein can reduce the carbon dioxide concentration of the feed gas stream by at least 90% such as at least 95%. In some embodiments, the carbon dioxide-depleted product gas stream can include 5 vol % or less carbon dioxide. For example, the carbon dioxide-depleted product gas stream can include 4 vol % or less carbon dioxide, 3 vol % or less carbon dioxide, 2 vol % or less carbon dioxide, 2.5 vol % or less carbon dioxide, 1.5 vol % or less carbon dioxide, 1 vol % or less carbon dioxide, 0.75 vol % or less carbon dioxide, or 0.5 vol % or less carbon dioxide. In certain embodiments, the carbon dioxide-depleted product gas stream can include 0.5 vol % to 2 vol % carbon dioxide. This stream can be discharged to the environment. The reduction of the carbon dioxide content to 20%, 10% or less of the content in the raw exhaust greatly reduces the environmental impact of discharging the stream.

Membrane Separation Methods

The membrane separation methods in some embodiments can include passing the feed gas stream through a first selectively permeable membrane (40) having a retentate side (41) and an opposing permeate side (43) to separate the feed gas stream into a first retentate stream and a first permeate stream. The method can include passing the first permeate stream through a second selectively permeable membrane (60) having a retentate side (61) and an opposing permeate side (63) to separate the first permeate stream into a second retentate stream and a second permeate stream. A sweep gas comprising the first retentate stream, the second retentate stream, or a combination thereof can be passed across the permeate side (43) of the first selectively permeable membrane (40). The second permeate stream, having a greater concentration of carbon dioxide than the feed gas stream, can be withdrawn. In these embodiments, the first selectively permeable membrane (40) and the second selectively permeable membrane can be the same or different.

In other embodiments, the membrane separation methods can include passing a feed gas stream through a first selectively permeable membrane (40) having a retentate side (41) and an opposing permeate side (43) to separate the feed gas stream into a first retentate stream and a first permeate stream. The first selectively permeable membrane (40) can have a relatively high carbon dioxide permeance, such as at least 1000 GPU at 57° C. and 1 atm feed pressure and a relatively modest carbon dioxide:nitrogen selectivity, such as at least 10 at 57° C. and 1 atm feed pressure. The method can further include passing the first permeate stream through a second selectively permeable membrane (60) having a retentate side (61) and an opposing permeate side (63) to separate the first retentate stream into a second retentate stream and a second permeate stream. The second permeate stream, having a greater concentration of carbon dioxide than the feed gas stream, can be withdrawn.

In still other embodiments, the membrane separation methods can include passing a feed gas stream through a first selectively permeable membrane (40) having a retentate side (41) and an opposing permeate side (43) to separate the feed gas stream into a first retentate stream and a first permeate stream. The method can include passing the first permeate stream through a second selectively permeable membrane (60) having a retentate side (61) and an opposing permeate side (63) to separate the first retentate stream into a second retentate stream and a second permeate stream. The first selectively permeable membrane (40) can have a relatively high carbon dioxide:nitrogen selectivity, such as at least 50 at 57° C. and 1 atm feed pressure and a relatively modest carbon dioxide permeance, such as at least 500 GPU at 57° C. and 1 atm feed pressure. The second permeate stream, having a greater concentration of carbon dioxide than the feed gas stream, can be withdrawn.

In further embodiments, the membrane separation methods can include passing a feed gas stream through a first selectively permeable membrane (40) having a retentate side (41) and an opposing permeate side (43) to separate the feed gas stream into a first retentate stream and a first permeate stream. The method can further include passing the first permeate stream through a second selectively permeable membrane (60) having a retentate side (61) and an opposing permeate side (63) to separate the first retentate stream into a second retentate stream and a second permeate stream. The method can further include applying a vacuum to the permeate side of the second selectively permeable membrane. The second permeate stream, having a greater concentration of carbon dioxide than the feed gas stream, can be withdrawn. In these embodiments, the first selectively permeable membrane (40) and the second selectively permeable membrane (60) can be the same or different.

For example, the first selectively permeable membrane (40) and the second selectively permeable membrane (60) can have a relatively high carbon dioxide:nitrogen selectivity, such as at least 50 at 57° C. and 1 atm feed pressure and a relatively modest carbon dioxide permeance, such as at least 500 GPU at 57° C. and 1 atm feed pressure. In another example, the first selectively permeable membrane can have a relatively high carbon dioxide permeance, such as at least 1000 GPU at 57° C. and 1 atm feed pressure and a relatively modest carbon dioxide:nitrogen selectivity, such as at least 10 at 57° C. and 1 atm feed pressure; and the second selectively permeable membrane can have a relatively high carbon dioxide:nitrogen selectivity, such as at least 50 at 57° C. and 1 atm feed pressure and a relatively modest carbon dioxide permeance, such as at least 500 GPU at 57° C. and 1 atm feed pressure.

In still further embodiments, the membrane separation methods can include passing a feed gas stream through a first selectively permeable membrane (40) having a retentate side (41) and an opposing permeate side (43) to separate the feed gas stream into a first retentate stream and a first permeate stream. The first selectively permeable membrane (40) can have a relatively high carbon dioxide:nitrogen selectivity, such as at least 50 at 57° C. and 1 atm feed pressure and a relatively modest carbon dioxide permeance, such as at least 500 GPU at 57° C. and 1 atm feed pressure. The first permeate stream, having a greater concentration of carbon dioxide than the feed gas stream, can be withdrawn. The method can further include passing the first retentate stream through a second selectively permeable membrane (60) having a retentate side (61) and an opposing permeate side (63) to separate the first retentate stream into a second retentate stream and a second permeate stream. The second selectively permeable membrane can have a relatively high carbon dioxide permeance, such as at least 1000 GPU at 57° C. and 1 atm feed pressure and a modest carbon dioxide:nitrogen selectivity, such as at least 10 at 57° C. and 1 atm feed pressure. The method can also include passing a sweep gas across the permeate side (63) of the second selectively permeable membrane (60). The second permeate stream can be returned to, for example, a combustor, and combined with the feed gas stream or can be discharged elsewhere as desired.

The permeate streams withdrawn in the methods described herein can be cooled and compressed to produce a fluid carbon dioxide product for sequestration or use.

FIGS. 1-4 described in greater detail as it relates to specific embodiments for integrating the two membranes for $CO_2$ capture from a gas stream (e.g., a combustion gas stream).

Figure 2:
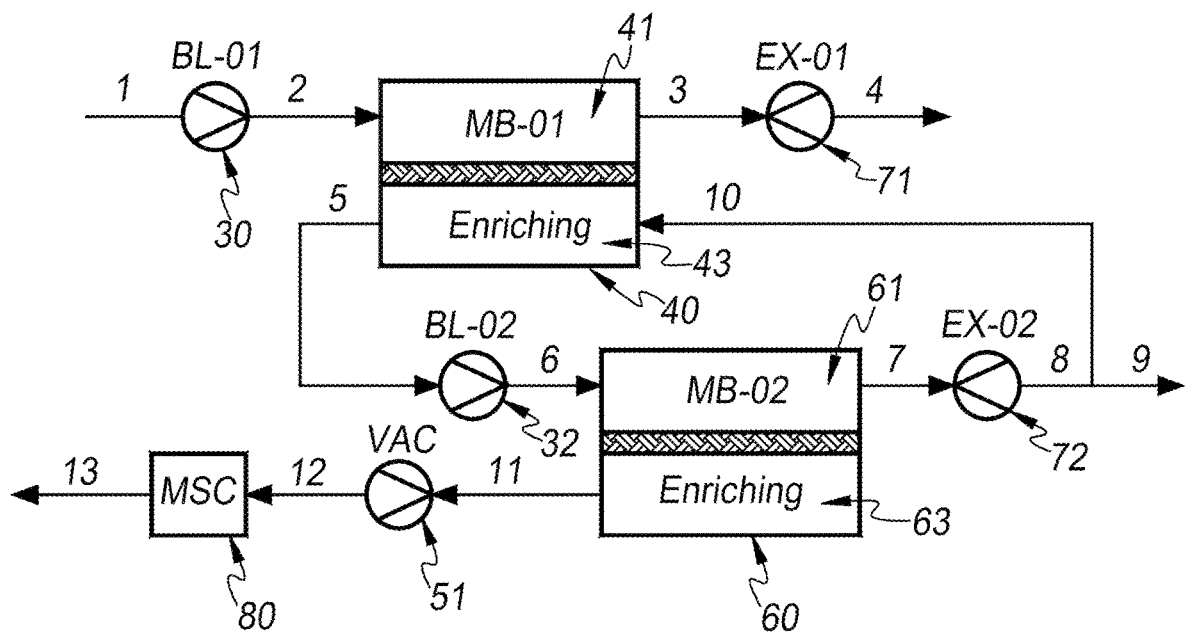
FIG. 2 is a flow diagram of an exemplary 2-stage hybrid membrane method (retentate recycle; EC2R1S).

FIGS. 1 and 2 show embodiments of the method integrating two types of membranes for $CO_2$ capture from a flue gas stream. Prior to contacting the flue gas stream to the membrane, the gas stream coming out from a combustor can be cleaned by passing through a baghouse filter to remove particulate matter and a flue gas desulfurization unit to mitigate the $SO_x$. The $SO_x$ concentration can be further reduced to <5 ppm by a caustic scrubber (i.e., 20 wt % NaOH). As shown in FIG. 1, a portion of the first retentate gas (4) of the first selectively permeable membrane (40) is passed as its own sweep gas (7). As shown in FIG. 2, a portion of the second retentate gas (7) of the second selectively permeable membrane (60) is passed to the permeate side (43) of the first selectively permeable membrane (40) as the sweep gas (10).

In FIG. 1, the cleaned flue gas stream (1) is pressurized by blower (30). The pressure of the feed gas stream can be as described herein, such as from 1.5 to 4 atm. The pressurized flue gas (2), combined with the second retentate stream (10) of the second selectively permeable membrane (60), flows to the first selectively permeable membrane (40) as feed gas stream (3). The first selectively permeable membrane (40) separates the feed into a $CO_2$-enriched first permeate stream (8) and a $CO_2$-depleted first retentate stream (4). In some embodiments, the first retentate stream (4) can contain 5 vol % or less $CO_2$, such as 4 vol % or less, 3 vol % or less, 2 vol % or less, 1 vol % or less, 0.75 vol % or less, or 0.5 vol % or less $CO_2$. The first permeate stream (8) can contain 30 vol % or greater $CO_2$, such as 35 vol % or greater or 40 vol % or greater $CO_2$.

The first retentate stream (4) can be expanded by a turbo expander (71) to about 1 atm for energy recovery. A portion, such as about 20% of the depressurized retentate stream (5) is passed to the permeate side (43) of the first selectively permeable membrane (40) as the sweep gas (7). The remainder of the first retentate stream (6) is vented. The first permeate stream (8) can contain 90% or greater of the $CO_2$ in the cleaned gas (1). The first permeate stream (8) is re-pressurized by blower (31) to a pressure of up to 4 atm and flows to the second selectively permeable membrane (60) as the feed (9). The second selectively permeable membrane (60) can further enrich the $CO_2$ to 95% or greater in the second permeate stream (11). The second retentate stream (10) is recycled back to the feed stream (3). A vacuum (51), having a pressure as described herein, is pulled at the permeate side (63) of the second selectively permeable membrane (60) to enhance the separation driving force. The vacuum train discharge (12) can be made to flow through an after-cooler and a water knockout drum, and subsequently is compressed by a multiple-stage compressor train (80) to provide stream 13. This stream can have 90% of the $CO_2$ in the flue gas with a purity of 95% or greater.

In FIG. 2, the cleaned flue gas stream (1) is pressurized by blower (30). The pressure of the feed gas stream (1) can be as described herein, such as from 1.5 to 4 atm The pressurized flue gas stream (2) flows to the first selectively permeable membrane (40) as feed. The first selectively permeable membrane (40) separates the feed into a $CO_2$-enriched first permeate stream (5) and a $CO_2$-depleted first retentate stream (3). In some embodiments, the first retentate stream (3) can contain 5 vol % or less $CO_2$, such as 4 vol % or less, 3 vol % or less, 2 vol % or less, 1 vol % or less, 0.75 vol % or less, or 0.5 vol % or less $CO_2$. The first permeate stream (5) can contain 35 vol % or greater $CO_2$, such as 40 vol % or greater or 45 vol % or greater $CO_2$. The first retentate stream (3) can be expanded by a turbo expander (70) to about 1 atm (5) for energy recovery and vented (4).

The first permeate stream (5) is re-pressurized by blower (32) to a pressure of up to 4 atm and flows to the second selectively permeable membrane (60) as the feed stream (6). The second selectively permeable membrane (60) can further enrich the $CO_2$ to 95% or greater in the second permeate stream (11) containing 90% or greater of the $CO_2$ in the flue gas with a purity of 95%, and a $CO_2$-depleted second retentate stream (7), containing from 4-5 vol % $CO_2$ and 94 vol % $N_2$. The second retentate stream (7) can be expanded by the second turbo expander (71) to 1 atm (8) for energy recovery. A portion, such as about 80% of the depressurized retentate (5) is passed to the permeate side (43) of the first selectively permeable membrane (40) as the sweep gas (10). The rest of the retentate is vented (9). A vacuum (51), having a pressure as described herein, is pulled at the permeate side of the second selectively permeable membrane (60) to enhance the separation driving force. The vacuum train discharge (12) can be made to flow through an after-cooler and a water knockout drum, and subsequently is compressed by a multiple-stage compressor train (80) to provide stream 13. This stream can have 90% of the $CO_2$ in the flue gas with a purity of 95% or greater.

Figure 3:
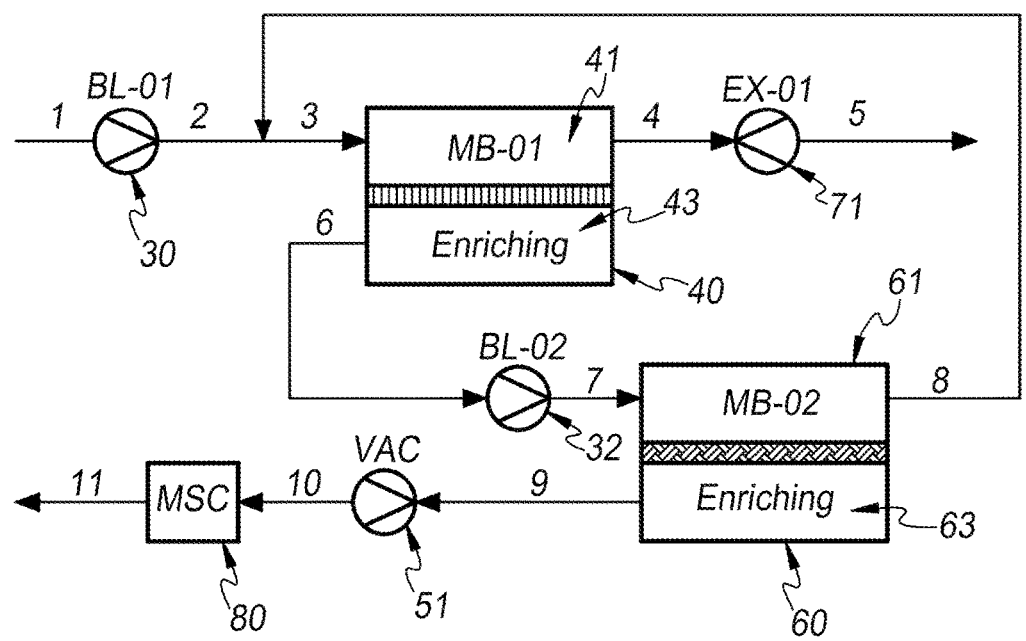
FIG. 3 is a flow diagram of an exemplary 2-stage hybrid membrane method described in Example 2 (no air sweep).

FIG. 3 shows a third embodiment of the method integrating two types of membranes for $CO_2$ capture from a gas stream such as a flue gas stream. In FIG. 3, the cleaned flue gas stream (1) flows to the membrane system and is pressurized by the blower (30). The optimum pressure of the feed gas stream can be as described herein, such as from 1.5 to 4 atm. The pressurized stream (2), combined with the second retentate stream (8) of the second selectively permeable membrane (60), is passed to the first selectively permeable membrane (40) as the feed gas stream (3). The first selectively permeable membrane (40) can utilize a highly permeable but less selective membrane. For example, the first selectively permeable membrane (40) can have a carbon dioxide:nitrogen selectivity of from 10 to 60 at 57° C. and 1 atm feed pressure and a carbon dioxide permeance of from 1000 to 3000 GPU at 57° C. and 1 atm feed pressure. The first selectively permeable membrane (40) can separate the cleaned flue gas into a $CO_2$-depleted first retentate stream (4) and a $CO_2$-enriched first permeate stream (6). In some embodiments, the first retentate stream (4) can contain 5 vol % or less $CO_2$, such as 4 vol % or less, 3 vol % or less, 2 vol % or less, 1 vol % or less, 0.75 vol % or less, or 0.5 vol % or less $CO_2$. The first permeate stream (6) can contain 30 vol % or greater $CO_2$, such as 35 vol % or greater or 40 vol % or greater $CO_2$.

The first retentate stream (4) have 90% or greater of the $CO_2$ in the cleaned flue gas (1) removed and can be expanded by a turbo expander (71) for energy recovery. The discharge (5) can be vented.

The first permeate stream (6) in FIG. 3 is re-pressurized by blower (32) and passes as the feed to the second selectively permeable membrane (60). The pressure of the first permeate feed stream (6) can be from 1.5 to 4 atm. The second selectively permeable membrane (60) can employ a highly selective membrane with modest permeance. For example, the second selectively permeable membrane (60) can have a carbon dioxide:nitrogen selectivity of from 50 to 1000 at 57° C. and 1 atm feed pressure and a carbon dioxide permeance of from 500 to 2500 GPU at 57° C. and 1 atm feed pressure. The second selectively permeable membrane (60) can further enrich the $CO_2$ to 95 vol % or greater in the second permeate stream (9). The second retentate stream (8) can contain 15 vol % $CO_2$ or less, which is recycled back to the feed stream (3).

A vacuum (51) is pulled at the permeate side (63) of the second selectively permeable membrane (60) to enhance the transmembrane driving force. The vacuum (51) can have a pressure as described herein, such as from 0.1 to 0.5 atm. The feed pressure to permeate pressure ratio can be as described herein, such as 7 or greater. The vacuum train discharge (10) can pass through an after-cooler and a water knockout drum, and then compressed by a multiple-stage compressor train (80) to provide stream 11. This stream can then be transported and sequestered.

It should be noted that, even though FIG. 3 employs a highly permeable but less selective membrane (40) as the first membrane and a highly selective membrane with modest permeance (60) as the second membrane, the membranes in each step may vary. For example, the method can employ two of the same selectively permeable membranes as the first and second membrane. In another example, the method can employ a highly selective membrane with modest permeance as the first membrane and a highly permeable but less selective membrane as the second membrane.

Figure 4:
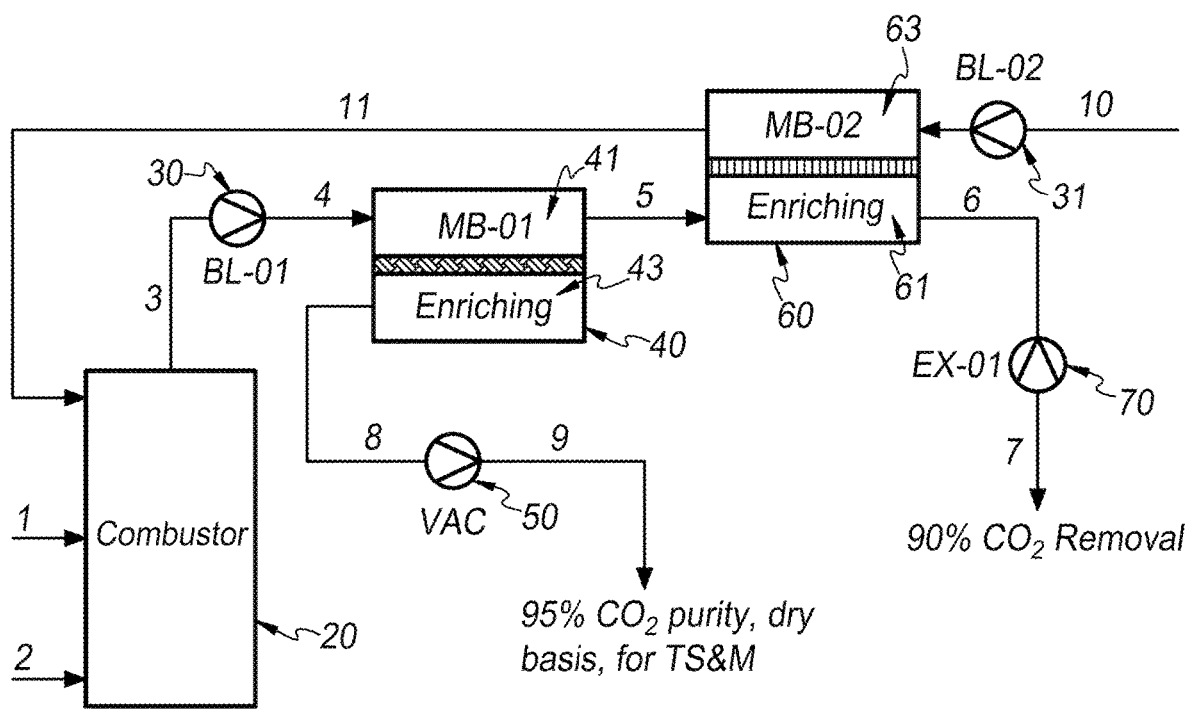
FIG. 4 is a flow diagram illustrating the 2-stage membrane method described in Example 1 (air sweep).

FIG. 4 shows a fourth embodiment of the method integrating two types of membranes for $CO_2$ capture from a gas stream such as a flue gas stream. As shown in FIG. 4, a gas stream (3) coming out from a combustor (20) is pressurized by compressor (30) to an optimum pressure. The optimum pressure can be as described herein, such as from 1.5 to 4 atm. The pressurized gas stream (4) passes to a first selectively permeable membrane (40). In some embodiments, the first selectively permeable membrane (40) can have a relatively high carbon dioxide:nitrogen selectivity of from 50 to 1000 at 57° C. and 1 atm feed pressure and a relatively modest carbon dioxide permeance of from 500 to 2500 GPU at 57° C. and 1 atm feed pressure. This membrane can separate the gas stream (3) into a carbon dioxide depleted first retentate stream (5) and a carbon dioxide enriched first permeate stream (8). The first retentate stream (5) can contain 10 vol % or less $CO_2$ on wet basis (e.g. 8 vol % or less, 6 vol % or less, 5 vol % or less, 4 vol % or less, 3 vol % or less, 2 vol % or less, 1 vol % or less, 0.75 vol % or less, or 0.5 vol % or less) $CO_2$ on wet basis. The first permeate stream (8) can contain 90 vol % or greater $CO_2$ on dry basis (e.g. 92 vol % or greater, 95 vol % or greater, 98 vol % or greater, or 99 vol % or greater) $CO_2$ on dry basis.

A vacuum (50) is pulled at the permeate side (43) of the first selectively permeable membrane (40) to provide a transmembrane driving force. The vacuum (50) can have a pressure as described herein such as 0.5 atm or less (e.g., from 0.11 to 0.5 atm). The feed pressure to permeate pressure ratio can be 7 or greater, such as from 10 to 40. The high $CO_2:N_2$ selectivity of the first selectively permeable membrane (40) can allow for applying a large pressure ratio to obtain a high $CO_2$ removal as well as a high $CO_2$ purity in only one step. The first permeate stream (8) can pass through an after-cooler and a water knockout, and then discharged by a train of vacuum pumps to provide stream 9. Stream 9 can be compressed for transportation, storage (sequestration), and monitoring.

The first retentate stream (5) passes as a feed to the air-sweep second selectively permeable membrane (60). The second selectively permeable membrane (60) can utilize a membrane with a relatively high $CO_2$ permeance but a relatively low $CO_2:N_2$ selectivity to reduce the membrane area. In some embodiments, the second selectively permeable membrane (60) can have a carbon dioxide:nitrogen selectivity of from 10 to 60 at 57° C. and 1 atm feed pressure and a carbon dioxide permeance of from 1000 to 3000 GPU at 57° C. and 1 atm teed pressure. All or part of the combustion air (10) is blown to the permeate side (63) of the second selectively permeable membrane (60) through a blower (31). The second selectively permeable membrane (60) can allow $CO_2$ to permeate preferentially and is returned with the sweep air (10) to the combustor in stream 11. Before flowing into the combustor (20), excessive amounts of water in stream 11 can be knocked out at ambient temperature (19° C.) to achieve an $O_2$ concentration higher than 18 vol %. The second retentate stream (6) can have 90 vol % or greater $CO_2$ removed compared to the raw gas stream without recirculation. The second retentate stream (6) can pass through to a turbo expander (70) to recover part of the compression energy. The treated gas (7) is vented. Additional streams include fuel feed stream (1) and a part of the combustion air stream (2).

This disclosure can be further described by the following examples, which are intended to be illustrative of the disclosure, but not limit the scope or underlying principles in any way.

EXAMPLES

The following examples are put forth so as to provide those of ordinary skill in the art with a complete disclosure and description of how the methods claimed herein are practiced and evaluated, and are intended to be purely exemplary and are not intended to limit the scope of the disclosure. Unless indicated otherwise, parts are parts by volume, temperature is in ° C. or is at ambient temperature, and pressure is at or near atmospheric.

The basis for the calculations is detailed below.

Membrane Transport Properties

The membranes, amine-based (similar to those described in U.S. Pat. No. 8,277,932, which is incorporated herein by reference in its entirety), polyethyleneoxide (PEO)-based, and polydimethylsiloxane (PDMS)-based, as well as their corresponding gas permeances for $CO_2$, $N_2$, and water vapor are shown in Table 1.

TABLE 1

Membrane transport properties.

| Material | $CO_2$ permeance (GPU) [†] | $CO_2$:$N_2$ | $CO_2$:$H_2O$ [‡] |
|---|---|---|---|
| Amine-based I | 1100 | 140 | 1 |
| Amine-based II | 1500 | 50 | 1 |
| PEO-based | 2000 | 20 | 1 |
| PDMS-based | 4000 | 5 | 1 |

[†] Gas permeation unit; 1 GPU = 1 × 10$^{-6}$ cm$^3$(STP)/cm$^2$/s/cmHg.
[‡] Estimated, not measured.

Assumptions Concerning the Power Plant

All calculations were based on a 550 MW net power coal-fired power plant. It was assumed that the raw flue gas was filtered to remove particulate matter. Then, the treated gas passed to a flue gas desulfurization unit and a caustic $SO_2$ polishing unit to reduce the $SO_2$ concentration to about 1-3 ppm. The compositions of the raw flue gas without recirculation and air feed are listed in Table 2. The flue gas and air flow rates were adjusted based on the gross power, which comprised the net power, the capture auxiliary, the compression auxiliary, and the coal power plant auxiliary. The capture auxiliary included all energy consumptions involved in the $CO_2$ separation method. The compression auxiliary was the energy consumption for compressing $CO_2$ to 2215 psi a at 51.1° C.

TABLE 2

Raw flue gas and air compositions.

| Component | Raw flue gas | Air |
|---|---|---|
| $CO_2$ | 13.17% | 0.04% |
| $H_2O$ | 17.25% | 0.99% |
| $N_2$ | 66.41% | 77.31% |
| $O_2$ | 2.37% | 20.74% |
| Ar | 0.80% | 0.92% |

Calculation Methodology

All calculations were performed with a modeling code in Matlab®. A Comsol® program solving for membrane operations developed in house was linked to Matlab via Live-Link™. Both MB-01 and MB-02 membrane stages were modeled as countercurrent configuration. All compressors, blowers, and turbo expanders were assumed to be 85% efficiency. All vacuum pumps were assumed to be 75% efficiency. For all cases, the $CO_2$ capture method aimed to achieve 90% recovery and at least 95% purity. 80% of the combustion air was used as the sweep air for MB-02 in FIG. 4. The rest of the combustion air was blown into the combustor as Stream 2 in FIG. 4, The $CO_2$ capture costs calculated were based on 2007 dollars for all cases.

Example 1

2-Stage Hybrid Membrane Methods of Carbon Dioxide Capture from Flue Gas

Disclosed herein are 2-stage membrane separation processes for capturing $CO_2$ from flue gas in a power plant. In the process, the flue gas stream flows to a vacuum membrane stage using a membrane with high $CO_2$/$N_2$ selectivity and moderate $CO_2$ permeance. The retentate gas then flows to an air-sweep membrane stage employing another membrane with high $CO_2$ permeance but low $CO_2$/$N_2$ selectivity. The $CO_2$-containing sweep air is passed to the combustor in a power plant. This process shows a reduced cost for $CO_2$ capture from flue gas as compared to various membrane performance properties evaluated.

Background

A variety of membrane-based processes are promising for $CO_2$ capture from flue gas in power plants. In these processes, the use of combustion air as the sweep gas for the $CO_2$ stripping stage to provide a transmembrane driving force without additional compression is a common element. Despite the similar designs of the air-sweep stripping stage, the system complexity and the membrane area requirement vary significantly based on the membrane transport properties. By using membranes with a high $CO_2$/$N_2$ selectivity, 90% $CO_2$ capture and 95% $CO_2$ purity can be achieved using only two membrane stages without a need for cryogenic distillation. However, the membrane area required for the stripping stage, the second membrane stage (air sweep stage), in such processes is about twice of the enriching stage, the first membrane stage (vacuum stage), since the membrane permeance was limited.

Ideally, membranes with a $CO_2$ permeance higher than 2000 GPU and a $CO_2$/$N_2$ selectivity higher than 140 are the most favorable for $CO_2$ capture from flue gas. However, polymer membranes typically exhibit a trade-off between permeance and selectivity. A more economic choice is to use a highly $CO_2$-selective membrane for the enriching stage (first stage) to achieve the required $CO_2$ removal and purity while a highly $CO_2$-permeable but less selective membrane can be utilized for the striping stage (second stage) to reduce its size.

System Description

The process integrating 2 types of membranes for $CO_2$ capture from flue gas is shown schematically in FIG. 4. As shown in FIG. 4, the flue gas coming out from the combustor (Stream 3) is pressurized by compressor BL-01 to about 1.5 atm. The pressurized flue gas (Stream 4) passes to the highly $CO_2$-selective enriching stage MB-01 (first stage). This step separates the flue gas into a $CO_2$ depleted retentate stream (Stream 5), usually containing less than 10 vol % $CO_2$ on wet basis, and a $CO_2$ enriched permeate stream (Stream 8), containing 95 vol % $CO_2$ on dry basis. A vacuum in the range of 150-200 torr is pulled at the permeate side of MB-01 to provide the transmembrane driving force. Usually, the feed to permeate pressure ratio is around 7. It is because of the high $CO_2$/$N_2$ selectivity of MB-01 that allows for applying a large pressure ratio to obtain a high $CO_2$ removal as well as a high $CO_2$ purity in only one step. Stream 8 goes through an after-cooler and a water knockout, and then is discharged by a train of vacuum pumps (Stream 9). Stream

9 is ready for $CO_2$ compression to about 2215 psia for transportation, storage (sequestration), and monitoring (TS&M).

The retentate Stream 5 passes as feed to the air-sweep membrane separation step MB-02 (second stage). This step uses membranes with a much higher $CO_2$ permeance but a lower $CO_2/N_2$ selectivity to reduce the membrane area. All or part of the combustion air (Stream 10) is blown to the sweep side of MB-02 through a blower BL-02. $CO_2$ permeates preferentially via the membrane and is returned with the sweep air to the combustor in Stream 11. Before flowing into the combustor, the excessive amount of water in Stream 11 is knocked out at ambient temperature (19° C.) to achieve an $O_2$ concentration higher than 18 vol %. The off-gas (Stream 6) has 90% $CO_2$ removed compared to the raw flue gas without recirculation. Stream 6 passes a turbo expander EX-01 to recover part of the compression energy. The treated flue gas (Stream 7) is vented. Additional streams include Stream 1 as fuel feed and Stream 2 as part of the combustion air.

Example 1-1 (Comparative)

A calculation was performed to illustrate the $CO_2$ capture from the 550 MW coal-fired power plant using Amine-based I membrane for both MB-01 and MB-02 membrane stages. It was assumed that the flue gas was compressed to 1.5 atm and the vacuum pump provided a vacuum of 150 torr. The results of the calculation are shown in Table 3.

TABLE 3

Calculation results for the amine-amine system.

| Parameter | Stream | | | | |
|---|---|---|---|---|---|
| | 3 | 5 | 6 | 8 | 11 |
| Pressure (atm) | 1.0 | 1.5 | 1.5 | 0.2 | 1.0 |
| Temperature (° C.) | 57 | 100 | 100 | 100 | 19 |
| Flow rate (mol/s) | 29217 | 23365 | 18631 | 5852 | 25085 |
| Component (mol %) | | | | | |
| $CO_2$ | 20.3% | 12.2% | 1.8% | 52.5% | 10.0% |
| $N_2$ | 59.7% | 73.9% | 91.6% | 2.8% | 68.8% |
| $H_2O$ | 17.2% | 10.4% | 2.2% | 44.7% | 2.2% |
| $O_2$ | 2.8% | 3.5% | 4.4% | 0.0% | 19.0% |

The membrane areas and the energy consumptions, along with the $CO_2$ capture cost and the cost of electricity (COE) increase, are as follows:
MB-01 membrane area=$6.35 \times 10^5$ m$^2$
MB-02 membrane area=$1.46 \times 10^6$ m$^2$
Gross power=682.6 MW
Capture auxiliary=47.7 MW
Compression auxiliary=46.7 MW
Power plant auxiliary=38.2 MW
Capture cost=$38.6/tonne $CO_2$
COE increase=55.2%

As can be seen, the membrane area of MB-02 was 2.3 times of the membrane area of MB-01. The $CO_2$ capture cost was mainly determined by the module and membrane replacement costs of MB-02. In addition, the oversized MB-02 affected the system compactness.

Example 1-2

A calculation was performed to illustrate the $CO_2$ capture from the 550 MW coal-fired power plant using the Amine-based I membrane for MB-01 while employing the PDMS-based membranes for MB-02. It was assumed that the flue gas was compressed to 1.5 atm and the vacuum pump provided a vacuum of 150 torr. The results of the calculation are shown in Table 4.

TABLE 4

Calculation results for the amine-PDMS system.

| Parameter | Stream | | | | |
|---|---|---|---|---|---|
| | 3 | 5 | 6 | 8 | 11 |
| Pressure (atm) | 1.0 | 1.5 | 1.5 | 0.2 | 1.0 |
| Temperature (° C.) | 57 | 100 | 100 | 100 | 19 |
| Flow rate (mol/s) | 44049 | 37737 | 19305 | 6312 | 37649 |
| Component (mol %) | | | | | |
| $CO_2$ | 18.5% | 13.2% | 1.8% | 50.4% | 12.3% |
| $N_2$ | 62.3% | 72.3% | 91.4% | 2.6% | 72.4% |
| $H_2O$ | 17.3% | 12.3% | 2.3% | 47.0% | 2.2% |
| $O_2$ | 1.9% | 2.3% | 4.4% | 0.0% | 13.1% |

The membrane areas and the energy consumptions, along with the capture cost and the COE increase, are as follows:
MB-01 membrane area=$6.48 \times 10^5$ m$^2$
MB-02 membrane area=$7.22 \times 10^5$ m$^2$
Gross power=705.1 MW
Capture auxiliary=67.4 MW
Compression auxiliary=48.1 MW
Power plant auxiliary=39.5 MW
Capture cost=$37.0/tonne $CO_2$
COE increase=56.3%

By using the PDMS-based membrane for MB-02, the membrane area required for this stage reduced significantly. However, the overall capture cost did not decrease much. The low selectivity of the PDMS-based membranes brought about a large $N_2$ permeation through MB-02, which increased the total recirculation flow rate and resulted in a higher energy penalty for flue gas compression. Besides, the elevated $N_2$ permeation also diluted the $O_2$ concentration down to 13.5 vol %, which was lower than 18 vol % needed for coal combustion.

Example 1-3

A calculation was performed to illustrate the $CO_2$ capture from the 550 MW coal-fired power plant using Amine-based I membranes for MB-01 while employing the PEO-based membranes for MB-02. It was assumed that the flue gas was compressed to 1.5 atm and the vacuum pump provided a vacuum of 150 torr. The results of the calculation are shown in Table 5. The method exemplified in this example is shown schematically in FIG. 5.

TABLE 5

Calculation results for the amine-PEO system.

| Parameter | Stream | | | | |
|---|---|---|---|---|---|
| | 3 | 5 | 6 | 8 | 11 |
| Pressure (atm) | 1.0 | 1.5 | 1.5 | 0.2 | 1.0 |
| Temperature (° C.) | 57 | 100 | 100 | 100 | 19 |

TABLE 5-continued

Calculation results for the amine-PEO system.

| Parameter | Stream | | | | |
|---|---|---|---|---|---|
| | 3 | 5 | 6 | 8 | 11 |
| Flow rate (mol/s) | 31391 | 25459 | 18730 | 5933 | 26927 |
| Component (mol %) | | | | | |
| $CO_2$ | 19.9% | 12.4% | 1.8% | 52.1% | 10.4% |
| $N_2$ | 60.2% | 73.6% | 91.6% | 2.7% | 69.3% |
| $H_2O$ | 17.3% | 10.7% | 2.2% | 45.2% | 2.2% |
| $O_2$ | 2.6% | 3.2% | 4.4% | 0.0% | 18.1% |

The membrane areas and the energy consumptions, along with the capture cost and the COE increase, are as follows:
MB-01 membrane area=$6.36 \times 10^5$ m$^2$
MB-02 membrane area=$8.96 \times 10^5$ m$^2$
Gross power=685.9 MW
Capture auxiliary=50.6 MW
Compression auxiliary=46.9 MW
Power plant auxiliary=38.4 MW
Capture cost=$35.8/tonne $CO_2$
COE increase=53.1%

The method required a MB-02 membrane area only 61% of the base case and the total recirculation flow rate increased only about 7%. The capture cost reduced by $2.4/tonne $CO_2$ compared with the base case. The oxygen concentration in the $CO_2$-enriched combustion air was 18.1 vol %, which satisfies the requirement for coal combustion.

Example 1-4

A calculation was performed to illustrate the $CO_2$ capture from the 550 MW coal-fired power plant using Amine-based I membrane for MB-01 while utilizing the PEO-based membranes for MB-02. In this case, the selectivities of both stages were slightly elevated to achieve a higher $O_2$ vol % in stream 11. The permeance and selectivity of the amine-based membranes were 1100 GPU and 170, respectively, and the permeance and selectivity of the PEO-based membranes for MB-02 were 2000 GPU and 25, respectively. It was assumed that the flue gas was compressed to 1.5 atm and the vacuum pump provided a vacuum of 150 torr. The results of the calculation are shown in Table 6.

TABLE 6

Calculation results for the amine-PEO system with elevated selectivities.

| Parameter | Stream | | | | |
|---|---|---|---|---|---|
| | 3 | 5 | 6 | 8 | 11 |
| Pressure (atm) | 1.0 | 1.5 | 1.5 | 0.2 | 1.0 |
| Temperature (° C.) | 57 | 100 | 100 | 100 | 19 |
| Flow rate (mol/s) | 29965 | 23896 | 18681 | 6069 | 25720 |
| Component (mol %) | | | | | |
| $CO_2$ | 18.8% | 10.7% | 1.8% | 50.7% | 8.6% |
| N2 | 61.2% | 76.1% | 91.5% | 2.7% | 70.6% |
| $H_2O$ | 17.2% | 9.8% | 2.3% | 46.6% | 2.2% |
| $O_2$ | 2.7% | 3.4% | 4.4% | 0.0% | 18.6% |

The membrane areas and the energy consumptions, along with the capture cost and the COE increase, are as follows:
MB-01 membrane area=$7.15 \times 10^5$ m$^2$
MB-02 membrane area=$7.81 \times 10^5$ m$^2$
Gross power=680.9 MW
Capture auxiliary=46.2 MW
Compression auxiliary=46.6 MW
Power plant auxiliary=38.1 MW
Capture cost=$35.5/tonne $CO_2$
COE increase=52.6%

The method required a MB-02 membrane area only 53% of the base case and the total recirculation flow rate increased only about 2.5%. The capture cost reduced by $3.1/tonne $CO_2$ compared with the base case. The oxygen concentration in the $CO_2$-enriched combustion air was 18.6 vol %, which comfortably satisfies the requirement for coal combustion.

Example 2

2-Stage Hybrid Membrane Methods Excluding an Air Sweep for $CO_2$ Capture from Flue Gas Disclosed herein is a 2-stage enriching cascade membrane process for capturing $CO_2$ from flue gas in a power plant. In the process, the flue gas flows to the first enriching membrane stage using a membrane with a relatively high $CO_2$ permeance and a relatively low $CO_2/N_2$ selectivity. The $CO_2$-enriched permeate gas then flows to the second enriching membrane stage employing another membrane with high $CO_2/N_2$ selectivity but modest $CO_2$ permeance. This stand-alone hybrid membrane process shows a comparable capture cost to the state-of-the-art membrane processes using power plant combustion air as membrane sweep gas. More importantly, the risk of affecting the power plant efficiency caused by air sweep is eliminated.

Background

The immense $CO_2$ emissions since the industrial revolution are the main cause for global warming. Post-combustion carbon capture (PCC) provides an option to mitigate $CO_2$ emissions from large stationary sources, followed by compression, transport, and geological sequestration; the captured $CO_2$ may be used for enhanced oil recovery. Because of the system compactness and energy efficiency, $CO_2$-selective membranes have been suggested to be a promising candidate for PCC. Most of membrane research are driven by membrane material design and membrane system synthesis. The goal of membrane material design is to synthesize materials with desirable permeance and selectivity, along with chemical and mechanical stabilities under testing conditions. The goal of membrane system synthesis, however, is to develop optimized configuration to achieve the separation specification with minimum cost.

Membrane processes tailored for PCC could be divided into three categories: 1) stripping cascade, which separates $CO_2$ from the flue gas by membrane stages in parallel, 2) enriching cascade, which enriches $CO_2$ gradually by membrane stages in series, and 3) air-sweep process, which integrates the membrane system to the combustor of the power plant and uses a portion of the combustion air as the sweep gas. Typically, a stripping cascade is not suitable for separation requiring high product purity and recovery simultaneously. An enriching cascade is capable of achieving at least 90% $CO_2$ recovery with 95% purity, but the capture cost and energy penalty are unfavorable. The air-sweep process, however, utilizes the combustion air as a "free" driving force, thereby resulting in a reduced capture cost. Despite the various advantages of the air-sweep process, the feasibility of redirecting the combustion air to the membrane system is yet to be verified. Firstly, it is required to modify the combustion air system of the existing power plant, in which the cost of retrofitting the existing ductwork could be substantial. Secondly, there is no need to restrict using only the secondary air in the power plant as the sweep gas, i.e., hence, the flow rate of sweep gas does not affect the power plant operation. Thirdly, the reduced $O_2$ content in the $CO_2$ laden air could affect the combustor efficiency. Consequently, it is desirable to design and optimize a stand-alone membrane process, e.g., the enriching cascade, which has a comparable capture cost to the highly integrated, possibly complicated air-sweep process.

The optimization of the enriching cascade membrane system is usually hindered by the available membrane materials. Polymeric membranes typically exhibit a trade-off between permeance and selectivity. If highly permeable but less selective membrane (e.g., $CO_2$ permeance >2000 GPU and $CO_2/N_2$ selectivity <20; 1 GPU=$10^{-6}$ cm$^3$ (STP)/cm$^2$/s/cmHg) is used, at least three sequential stages are needed to enrich the $CO_2$ to 95% purity. The repeated compressions of the $CO_2$-enriched streams lead to a high energy consumption. On the other hand, if highly selective membrane with modest permeance (e.g., >200 selectivity with <1000 GPU) is employed, the membrane area required is tremendous. Since membrane materials with both high permeance and selectivity are not readily available, a more realistic choice is to combine the two different types of the membranes into one system. Herein, a 2-stage hybrid enriching cascade membrane system using a highly permeable but less selective membrane for the first enriching stage in combination with a highly selective but less permeable membrane for the second enriching stage is investigated; no air sweep is used in either stage.

System Description

A process integrating 2 types of membranes for $CO_2$ capture from flue gas is shown schematically in FIG. 3. The flue gas coming out from the combustor passes through a baghouse filter to remove the particulate matter and a flue gas desulfurization unit (FGD) to mitigate the $SO_x$. The $SO_x$ concentration is further reduced to <5 ppm by a caustic scrubber (i.e., 20 wt. % NaOH). The cleaned flue gas (Stream 1) flows to the membrane system and is pressurized by the blower (BL-01) to 4 atm. This stream (Stream 2), combined with the retentate (Stream 8) of the second enriching stage (MB-02), is passed to the first enriching stage (MB-01) as the feed gas (Stream 3). MB-01 utilizes a highly permeable but less selective membrane. This step separates the cleaned flue gas into a $CO_2$-depleted retentate (Stream 4), usually containing about 1.8 vol. % $CO_2$, and a $CO_2$-enriched permeate (Stream 6), containing ~30 vol. % $CO_2$. The retentate (Stream 4) has had 90% of the $CO_2$ in the cleaned flue gas (Stream 1) removed and is expanded by a turbo expander (EX-01) for energy recovery. The discharge of EX-01 (Stream 5) is vented. The permeate (Stream 6) is re-pressurized by blower BL-02 to 4 atm and passes as the feed to the second enriching stage (MB-02). This step employs a highly selective membrane with modest permeance. This stage further enriches the $CO_2$ to >95 vol. % in the permeate (Stream 9). The retentate (Stream 8), usually containing ~13.5 vol. % $CO_2$, is recycled back to the feed of MB-01. A vacuum of 500-600 torr is pulled at the permeate side of MB-02 by VAC to enhance the transmembrane driving force. The vacuum train discharge (Stream 10) passes through an after-cooler and a water knockout drum, and then is compressed by a 7-stage compressor train (MSC) to 15 MPa (~2200 psi, Stream 11). This stream is ready for $CO_2$ transport and sequestration.

Example 2-1 (Comparative)

A calculation was performed to illustrate the $CO_2$ capture from the 550 MW coal-fired power plant with the air-sweep method. It was assumed that the cleaned flue gas was compressed to 1.5 atm and the vacuum train provided a vacuum of 150 torr. 80% of the combustion air (i.e., secondary air of the combustor) was passed as the sweep gas. The Amine-based I membrane was used in both MB-01 and MB-02. The results of the calculation are shown in Table 3 (above).

Example 2-2 (Comparative)

A calculation was performed to illustrate the $CO_2$ capture from the 550 MW coal-fired power plant using the enriching cascade method. Amine-based membrane I was employed in both MB-01 and MB-02. The results of the calculation are shown in Table 7. This is the base case for the following examples.

TABLE 7

Calculation results for the amine-amine enriching cascade system.

| Parameter | Stream | | | | |
|---|---|---|---|---|---|
| | 3 | 5 | 7 | 8 | 9 |
| Pressure (atm) | 4.0 | 1.0 | 4.0 | 4.0 | 0.8 |
| Temperature (° C.) | 100 | 20 | 100 | 100 | 32 |
| Flow rate (mol/s) | 29179 | 18308 | 8140 | 3868 | 3287 |
| Component (vol. %) | | | | | |
| $CO_2$ | 13.25% | 1.83% | 43.38% | 13.50% | 91.53% |
| $N_2$ | 68.57% | 91.69% | 39.58% | 81.20% | 2.45% |
| $H_2O$ | 15.45% | 2.13% | 17.04% | 5.30% | 6.01% |
| $O_2$ | 2.73% | 4.36% | 0.00% | 0.00% | 0.00% |

The membrane areas and the energy consumptions, along with the capture cost and the COE increase, are as follows:
MB-01 membrane area=$6.15 \times 10^6$
MB-02 membrane area=$1.70 \times 10^5$ m$^2$
Gross power=709.3 MW
Capture auxiliary=77.7 MW
Compression auxiliary=44.4 MW
Power plant auxiliary=37.2 MW
Capture cost=$54.7/tonne $CO_2$
COE increase=79.8%

By using the amine-amine enriching cascades method, the capture cost was $16/tonne $CO_2$ higher than the air-sweep method. The total membrane area was 3 times of the one of the air-sweep method. The oversized MB-01 was the main cause of the high capture cost. Consequently, the amine-amine enriching cascade method was outplayed by the air-sweep method. Any endeavor that can reduce the size of MB-01 will be favored to improve the enriching cascade method.

Example 2-3 (Comparative)

A calculation was performed to illustrate the $CO_2$ capture from the 550 MW coal-fired power plant using the enriching cascade method. The PEO-based membrane was employed in both MB-01 and MB-02. The results of the calculation are shown in Table 8.

TABLE 8

Calculation results for the PEO-PEO enriching cascade system.

| Prameter | Stream | | | | |
|---|---|---|---|---|---|
| | 3 | 5 | 7 | 8 | 9 |
| Pressure (atm) | 4.0 | 1.0 | 4.0 | 4.0 | 0.8 |
| Temperature (° C.) | 100 | 20 | 100 | 100 | 32 |
| Flow rate (mol/s) | 36290 | 19036 | 14840 | 8824 | 4429 |
| Component (vol. %) | | | | | |
| $CO_2$ | 13.28% | 1.91% | 30.03% | 13.50% | 73.72% |
| $N_2$ | 69.61% | 91.43% | 52.93% | 78.84% | 20.27% |
| $H_2O$ | 14.73% | 2.11% | 17.04% | 7.66% | 6.01% |
| $O_2$ | 2.38% | 4.55% | 0.00% | 0.00% | 0.00% |

It should be noted that the $CO_2$ concentration in the permeate of MB-02 was only 73.7 vol. %. Due to the limited selectivity of the PEO-based membrane, the PEO-PEO enriching cascade could not achieve the 95% purity requirement in two stages. A third enriching stage was required to further purify the permeate of MB-02. It not only incurred a more complex system, but required the permeate of MB-02 to be re-pressurized before passing to the third enriching stage. Therefore, using the highly permeable but less selective membrane alone in an enriching cascade could not compete with the air-sweep method.

Example 2-4

A calculation was performed to illustrate the $CO_2$ capture from the 550 MW coal-fired power plant using the enriching cascade method. Amine-based II membrane was employed in MB-01 while the amine-based I membrane was used in MB-02. The results of the calculation are shown in Table 9.

TABLE 9

Calculation results for the amine II-amine I enriching cascade system.

| Prameter | Stream | | | | |
|---|---|---|---|---|---|
| | 3 | 5 | 7 | 8 | 9 |
| Pressure (atm) | 4.0 | 1.0 | 4.0 | 4.0 | 0.8 |
| Temperature (° C.) | 100 | 20 | 100 | 100 | 32 |
| Flow rate (mol/s) | 32044 | 18702 | 10770 | 6140 | 3387 |

TABLE 9-continued

Calculation results for the amine II-amine I enriching cascade system.

| Prameter | Stream | | | | |
|---|---|---|---|---|---|
| | 3 | 5 | 7 | 8 | 9 |
| Component (vol. %) | | | | | |
| $CO_2$ | 13.26% | 1.83% | 36.29% | 13.50% | 90.91% |
| $N_2$ | 69.23% | 91.74% | 46.67% | 80.16% | 3.08% |
| $H_2O$ | 14.96% | 2.06% | 17.04% | 6.34% | 6.01% |
| $O_2$ | 2.55% | 4.36% | 0.00% | 0.00% | 0.00% |

The membrane areas and the energy consumptions, along with the capture cost and the COE increase, are as follows:
MB-01 membrane area=$1.79 \times 10^6$ $m^2$
MB-02 membrane area=$2.12 \times 10^5$ $m^2$
Gross power=725.9 MW
Capture auxiliary=92.1 MW
Compression auxiliary=45.7 MW
Power plant auxiliary=38.0 MW
Capture cost=$41.7/tonne $CO_2$
COE increase=62.3%

The method utilized a MB-01 membrane area only 30% of the amine-amine enriching cascade method. The capture cost reduced by $13/tonne $CO_2$ compared with the base case and was in a similar range to the air-sweep method. Engineered membrane material comprising amines and PEO may be used as amines and PEO are miscible and can be blended to make such a membrane. Nevertheless, this example shows that increasing the permeance of MB-01 while relaxing the requirement for selectivity is beneficial for optimizing the enriching cascade method.

Example 2-5

A calculation was performed to illustrate the $CO_2$ capture from the 550 MW coal-fired power plant using the enriching cascade method. The PEO-based membrane was employed in MB-01 while the Amine-based I membrane was used in MB-02. The results of the calculation are shown in Table 10.

TABLE 10

Calculation results for the PEO-amine I enriching cascade system.

| Parameter | Stream | | | | |
|---|---|---|---|---|---|
| | 3 | 5 | 7 | 8 | 9 |
| Pressure (atm) | 4.0 | 1.0 | 4.0 | 4.0 | 0.8 |
| Temperature (° C.) | 100 | 20 | 100 | 100 | 32 |
| Flow rate (mol/s) | 37175 | 19408 | 15410 | 10240 | 3548 |
| Component (vol. %) | | | | | |
| $CO_2$ | 13.29% | 1.83% | 29.75% | 13.50% | 90.24% |
| $N_2$ | 69.98% | 91.80% | 53.21% | 78.77% | 3.74% |
| $H_2O$ | 14.45% | 1.99% | 17.04% | 7.73% | 6.01% |
| $O_2$ | 2.28% | 4.37% | 0.00% | 0.00% | 0.00% |

The membrane areas and the energy consumptions, along with the capture cost and the COE increase, are as follows:
MB-01 membrane area=$8.95 \times 10^5$ $m^2$
MB-02 membrane area=$2.64 \times 10^5$ $m^2$
Gross power=754.8 MW
Capture auxiliary=117.4 MW
Compression auxiliary=47.8 MW
Power plant auxiliary=39.6 MW
Capture cost=$41.4/tonne $CO_2$
COE increase=64.3%

The method required a MB-01 membrane area only 14.6% of the amine-amine enriching cascade method. The capture cost reduced by $13/tonne $CO_2$ compared with the base case and was in a similar range to the air-sweep method. The hybrid enriching cascade membrane method has the potential to be an alternative to the air-sweep method.

Example 2-6

A calculation was performed to illustrate the $CO_2$ capture from the 550 MW coal-fired power plant using the enriching cascade method. The PEO-based membrane was employed in MB-01 while the Amine-based I membrane was used in MB-02. In this example, the permeance of the amine-based membrane I was reduced to 500 GPU while keeping the selectivity of 140. The stream compositions were similar to those listed in Table 10 and thus omitted here. The membrane areas and the energy consumptions, along with the capture cost and the COE increase, are as follows:
MB-01 membrane area=$8.94 \times 10^5$ $m^2$
MB-02 membrane area=$5.82 \times 10^5$ $m^2$
Gross power=754.8 MW
Capture auxiliary=117.4 MW
Compression auxiliary=47.8 MW
Power plant auxiliary=39.6 MW
Capture cost=$42.4/tonne $CO_2$
COE increase=65.8%

A reduced amine-based membrane permeance resulted in an increased capture cost, but the effect was not significant.

As demonstrated in this example, reducing the amine membrane permeance by one half only led to an increase of capture cost of $1/tonne $CO_2$. Consequently, the key design elements of the hybrid enriching cascade system are the high permeance of MB-01 and the high selectivity of MB-02.

Example 3

2-Stage Hybrid Membrane Method Including a Retentate Recycle Sweep Gas for $CO_2$ Capture from Flue Gas This example illustrates two 2-stage membrane methods for capturing $CO_2$ from flue gas in a power plant in which a retentate gas stream is recycled as a sweep gas. In the first process, a portion of the retentate of the first membrane stage is recycled as its own sweep gas. The second type recycles a part of the retentate of the second membrane stage to the permeate side of the first membrane stage as the sweep gas. Highly selective amine-based membrane is used to achieve 90% $CO_2$ capture with >95% purity. Both processes show significant improvements compared to the conventional enriching cascade design, and the performances are comparable to the state-of-the-art air sweep processes.

Background

The combustion of fossil fuels (coal, petroleum, and natural gas) in the energy sector is the major contributor to the immense $CO_2$ emissions and global warming. The fundamental goal of post-combustion carbon capture (PCC) is to separate $CO_2$ from combustion flue gas with low capture cost and high energy efficiency; however, the practice is technically challenging. The $CO_2$ concentration in the flue gas is notably low. With the enormous flue gas flow rate, conventional technologies, e.g., aqueous amine absorption, usually lead to voluminous and energy intensive systems.

Because of the system compactness, $CO_2$-selective membranes are an emerging technology in PCC. Typically, a pressure difference across the membrane is created by pressurizing the flue gas or pulling a vacuum on the permeate side. However, such a setting usually requires impractically high $CO_2$ permeance and $CO_2/N_2$ selectivity to have reasonable capture cost and energy consumption.

The state-of-the-art membrane processes integrate the carbon capture system to the power plant combustor and passes the combustion air as the sweep gas to the permeate side of the membrane. The sweep gas reduces the partial pressure of $CO_2$ on the permeate side, thereby no excessive feed compression or vacuum are required to supply the transmembrane driving force. Although the analyses of the air-sweep process in the literature showed a lowest capture cost and energy penalty, there are uncertainties in redirecting the combustion air into the membrane system. Firstly, the modification of the existing power plant is required, and the cost of retrofitting the air delivery ductwork could be substantial. Secondly, only the secondary combustion air can be used as the sweep gas. Passing the primary air to the membrane system leads to a severe drop of the combustor efficiency. Lastly, the reduced $O_2$ concentration in the $CO_2$ laden air could affect the fuel combustion. Therefore, it is desirable to seek a new source of sweep gas other than the combustion air.

System Description

Two types of retentate recycle processes are disclosed in the present invention. For the first type as shown in FIG. 1, a portion of the retentate gas of the first membrane stage is passed as its own sweep gas. Hereafter, this process is referred as EC1R1S (enriching cascade with the first-stage retentate as the first-stage sweep gas). For the second type as shown in FIG. 2, a portion of the retentate gas of the second membrane stage is passed to the permeate side of the first membrane stage as the sweep gas. Hereafter, this process is referred as EC2R1S (enriching cascade with the second-stage retentate as the first-stage sweep gas). For both processes, the flue gas coming out of the combustor flows through a baghouse filter to remove the particulate matter and a flue gas desulfurization unit (FGD) to mitigate the $SO_x$. The $SO_x$ concentration is further reduced to <5 ppm by a caustic scrubber (i.e., 20 wt. % NaOH) and then the cleaned flue gas is passed to the membrane system (Stream 1 in FIG. 1 and FIG. 2). For EC1R1S, the cleaned flue gas (Stream 1) is pressurized by blower BL-01 to 4 atm. The pressurized flue gas (Stream 2), combined with the retentate (Stream 10) of the second membrane stage (MB-01), flows to the first membrane stage (MB-01) as feed (Stream 3). MB-01 separates the feed into a $CO_2$-enriched permeate (Stream 8), usually containing ~35 vol. % $CO_2$, and a $CO_2$-depleted retentate (Stream 4), usually containing ~2 vol. %/$CO_2$ and 91 vol. %/$N_2$. The retentate (Stream 4) is expanded by a turbo expander EX-01 to 1 atm (Stream 5) for energy recovery. 20% of the depressurized retentate (Stream 5) is passed to the permeate side of MB-01 as the sweep gas (Stream 7). The rest of the retentate (Stream 6) is vented. The permeate (Stream 8) contains >90% of the $CO_2$ in the cleaned flue gas (Stream 1). It is re-pressurized by blower BL-02 to 4 atm and flows to MB-02 as the feed (Stream 9). This membrane stage further enriches the $CO_2$ to >95% in its permeate (Stream 11). The retentate (MB-02), containing 13.5 vol. % $CO_2$, is recycled back to the feed of MB-01. A vacuum (VAC) of 600 torr is pulled at the permeate side of MB-02 to enhance the separation driving force. The vacuum train discharge (Stream 12) flows through an after-cooler and a water knockout drum, and subsequently is compressed by a 7-stage compressor train (MSC) to 15 MPa (~2200 psi, Stream 13). This stream has 90% of the $CO_2$ in the flue gas with a purity of >95%.

In the second type of retentate recycle process (EC2R1S) as shown in FIG. 2, the cleaned flue gas (Stream 1) is pressurized by blower BL-01 to 4 atm and flows to MB-01 as the feed (Stream 2). This step separates the flue gas into a $CO_2$-depleted retentate (Stream 3), containing 2 vol. % $CO_2$, and a $CO_2$-enriched permeate (Stream 5), usually containing ~41 vol. % $CO_2$. The retentate (Stream 3) is expanded by the first turbo expander EX-01 to 1 atm for energy recovery and vented (Stream 4). The permeate (Stream 5) is re-pressurized by blower BL-02 to 4 atm and passes to MB-02 as the feed (Stream 6). MB-02 separates Stream 6 into a $CO_2$-enriched permeate (Stream 11), containing 90% of the $CO_2$ in the flue gas with a purity of 95%, and a $CO_2$-depleted retentate (Stream 7), usually containing 4-5 vol. % $CO_2$ and 94 vol. % $N_2$. The retentate (Stream 7) is expanded by the second turbo expander EX-02 to 1 atm (Stream 8) for energy recovery. 80% of the depressurized retentate is recycled to the permeate side of MB-01 as the sweep gas (Stream 10). The rest of the retentate is vented (Stream 9). A vacuum of 400 torr is pulled at the permeate side of MB-02 by VAC. The vacuum train discharge (Stream 12) goes through an after-cooler and a water knockout drum, and then is compressed by a 7-stage compressor train (MSC) to 15 MPa (~2200 psi, Stream 13). This stream has 90% of the $CO_2$ in the flue gas with a purity of >95%, which is ready for transport and sequestration.

Example 3-1 (Comparative)

A calculation was performed to illustrate the $CO_2$ capture from the 550 MW coal-fired power plant with the air-sweep method. A detailed description of the method can be found in Ramasubramanian et al. It was assumed that the cleaned flue gas was compressed to 1.5 atm, and the vacuum train provided a vacuum of 150 torr. 80% of the combustion air (i.e., secondary air of the combustor) was passed as the sweep gas. The results of the calculation are shown in Table 3 (above).

Example 3-2 (Comparative)

A calculation was performed to illustrate the $CO_2$ capture from the 550 MW coal-fired power plant using EC1R1S with 0% retentate recycle. Amine-based I membrane was used for both MB-01 and MB-02. When the retentate of MB-01 is not passed as the sweep of its own, the EC1R1S method reduces to a simple enriching cascade method. The purpose is to show the effect of using internal sweep. The results of the calculation are shown in Table 11. This is the base case for the following examples.

TABLE 11

Calculation results for EC1R1S with 0% retentate recycle.

| Parameter | Stream | | | | |
|---|---|---|---|---|---|
| | 3 | 5 | 9 | 10 | 11 |
| Pressure (atm) | 4.0 | 1.0 | 4.0 | 4.0 | 0.8 |
| Temperature (° C.) | 100 | 20 | 100 | 100 | 32 |
| Flow rate (mol/s) | 29179 | 18308 | 8140 | 3868 | 3287 |
| Component (vol. %) | | | | | |
| $CO_2$ | 13.25% | 1.83% | 43.38% | 13.50% | 91.53% |
| $N_2$ | 68.57% | 91.69% | 39.58% | 81.20% | 2.45% |
| $H_2O$ | 15.45% | 2.13% | 17.04% | 5.30% | 6.01% |
| $O_2$ | 2.73% | 4.36% | 0.00% | 0.00% | 0.00% |

The membrane areas and the energy consumptions, along with the capture cost and the COE increase, are as follows:
MB-01 membrane area=$6.15 \times 10^6$ m$^2$
MB-02 membrane area=$1.70 \times 10^5$ m$^2$
Gross power=709.3 MW
Capture auxiliary=77.7 MW
Compression auxiliary=44.4 MW
Power plant auxiliary=37.2 MW
Capture cost=$54.7/tonne $CO_2$
COE increase=79.8%

When the retentate recycle was absent, the capture cost was $16/tonne $CO_2$ higher than the air-sweep method. The total membrane area was 3 times that of the air-sweep method. The oversized MB-01 was the main cause of the high capture cost. Consequently, the simple enriching cascade method was outplayed by the air-sweep method. Any endeavor that can reduce the size of MB-01 will be favored to improve the system performance. The approach disclosed in the present invention is to recycle a portion of the retentate as the sweep gas.

Example 3-3

A calculation was performed to illustrate the $CO_2$ capture from the 550 MW coal-fired power plant using EC1R1S. Amine-based I membrane was used for both MB-01 and MB-02. 20% of the MB-01 retentate was used as its own sweep gas. The results of the calculation are shown in Table 12.

TABLE 12

Calculation results for the EC1R1S method.

| Parameter | Stream | | | | |
|---|---|---|---|---|---|
| | 3 | 7 | 9 | 10 | 11 |
| Pressure (atm) | 4.0 | 1.0 | 4.0 | 4.0 | 0.8 |
| Temperature (° C.) | 100 | 100 | 100 | 100 | 32 |

TABLE 12-continued

Calculation results for the EC1R1S method.

| Parameter | Stream | | | | |
|---|---|---|---|---|---|
| | 3 | 7 | 9 | 10 | 11 |
| Flow rate (mol/s) | 30636 | 4471 | 10248 | 5854 | 3237 |
| Component (vol. %) | | | | | |
| $CO_2$ | 13.26% | 1.83% | 36.46% | 13.50% | 90.99% |
| $N_2$ | 68.61% | 91.74% | 44.92% | 76.98% | 3.00% |
| $H_2O$ | 14.94% | 2.06% | 16.72% | 6.19% | 6.01% |
| $O_2$ | 3.18% | 4.36% | 1.90% | 3.33% | 0.00% |

The membrane areas and the energy consumptions, along with the capture cost and the COE increase, are as follows:
MB-01 membrane area=$1.03 \times 10^6$ m$^2$
MB-02 membrane area=$2.05 \times 10^5$ m$^2$
Gross power=695.1 MW
Capture auxiliary=64.8 MW
Compression auxiliary=43.8 MW
Power plant auxiliary=36.4 MW Capture cost=$38.5/tonne $CO_2$
COE increase=54.9%

The method required a MB-01 membrane area only 16.7% of that in the base case. The capture cost reduced by $16.2/tonne $CO_2$ compared with the base case and was in a similar range to the air-sweep method. The recycled retentate contained 91 vol. % $N_2$. This stream diluted the $CO_2$ in the permeate side of MB-01, thereby the transmembrane driving force was enhanced. More importantly, the presence of $N_2$ on the permeate side reduced the permeation driving force of $N_2$. Consequently, the amount of pressurized $N_2$ lost from the feed to the permeate side was reduced. For this reason, the energy recovered by EX-01 increased and the energy consumption of the EC1R1S reduced by 14.2 MW compared to the base case. Overall, EC1R1S showed comparable performance to the air-sweep method. Moreover, the limitations associated with using the combustion air as the sweep were avoided.

Example 3-4

A calculation was performed to illustrate the $CO_2$ capture from the 550 MW coal-fired power plant using EC2R1S Amine-based I membrane was used for both MB-01 and MB-02, 80% of the MB-02 retentate was used as the first-stage sweep gas. The results of the calculation are shown in Table 13.

TABLE 13

Calculation results for the EC2R1S method.

| Parameter | Stream | | | | |
|---|---|---|---|---|---|
| | 2 | 4 | 6 | 10 | 11 |
| Pressure (atm) | 4.0 | 1.0 | 4.0 | 1.0 | 0.5 |
| Temperature (° C.) | 100 | 20 | 100 | 100 | 32 |
| Flow rate (mol/s) | 25338 | 17586 | 7512 | 2523 | 3449 |
| Component (vol. %) | | | | | |
| $CO_2$ | 13.21% | 1.90% | 41.64% | 4.66% | 86.43% |
| $N_2$ | 66.64% | 91.68% | 41.31% | 93.44% | 4.55% |
| $H_2O$ | 17.00% | 1.88% | 17.04% | 1.91% | 9.02% |
| $O_2$ | 3.15% | 4.54% | 0.00% | 0.00% | 0.00% |

The membrane areas and the energy consumptions, along with the capture cost and the COE increase, are as follows:
MB-01 membrane area=$1.51 \times 10^6$ m$^2$
MB-02 membrane area=$2.75 \times 10^5$ m$^2$
Gross power=710.0 MW
Capture auxiliary=77.7 MW
Compression auxiliary=45.1 MW
Power plant auxiliary=37.2 MW
Capture cost=$ 40.8/tonne $CO_2$
COE increase=58.9%

The method required a MB-01 membrane area only 24.6% of the base case. The capture cost reduced by $13.9/tonne $CO_2$ compared with the base case and was $2.2/tonne $CO_2$ higher than the air-sweep method. Compared to EC1R1S, EC2R1S showed a higher capture cost and energy consumption. The $CO_2$ concentration in the sweep gas of EC2R1S was higher than that in EC1R1S. Therefore, the efficiency of the sweep gas was worse than EC1R1S. Though not as advantageous as EC1R1S, EC2R1S offered a significant improvement compared to the base case.

REFERENCES

[1] R. W. Baker, J. G. Wijmans, T. C. Merkel, H. Lin, R. Daniels, S. Thompson, "Gas separation method using membranes with permeate sweep to remove $CO_2$ from combustion gases", U.S. Pat. No. 7,964,020 (Jun. 21, 2011).

[2] R. W. Baker, J. G. Wijmans, T. C. Merkel, H. Lin, R. Daniels, S. Thompson, "Combustion systems, power plants, and flue gas treatment systems incorporating sweep-based membrane separation units to remove carbon dioxide from combustion gases", U.S. Pat. No. 8,016,923 (Sep. 13, 2011).

[3] W. S. W. Ho, H. Verweij, K. Shqau, Ramasubramanian, "Systems, compositions, and methods for fluid purification", U.S. Pat. No. 9,216,390 (Dec. 22, 2015).

[4] W. S. W. Ho, "Membranes, methods of making membranes, and methods of separating gases using membranes", U.S. Pat. No. 8,277,932 (Oct. 2, 2012).

[5] K. Ramasubramanian, H. Verweij, and W. S. W. Ho, "Membrane methods for carbon capture from coal-fired power plant flue gas: A modeling and cost study", *J. Membr. Sci.*, 10.1016/j.memsci.2012.07.029, 421-422, 299-310 (2012).

[6] T. C. Merkel, H. Lin, X. Wei, R. Baker, "Power Plant Post-Combustion Carbon Dioxide Capture: An Opportunity for Membranes", *J. Membr. Sci.,* 359, 126-139 (2010).

[7] W. H. Morgan, L. K. Bleikamp, D. G. Kalthod, "Hollow fiber membrane dryer with internal sweep", U.S. Pat. No. 5,525,143 (Jun. 11, 1996).

[8] J. H. Burban, R. O. Crowder, "Compressed gas systems utilizing a variable pressure membrane air drier, and method of operation thereof", U.S. Pat. No. 6,616,735 (Sep. 9, 2003).

[9] M. Straub, J. A. Jensvold, R. K. Chan, "Sweep gas for membrane-based dehydration modules", U.S. Pat. No. 8,409,324 (Apr. 2, 2013).

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:

1. A method for separating carbon dioxide from a feed gas stream, the method comprising:

passing the feed gas stream comprising from 5% to 80%, by volume, carbon dioxide through a first selectively permeable membrane having a retentate side and an opposing permeate side to separate the feed gas stream into a first retentate stream and a first permeate stream;

passing the first permeate stream through a second selectively permeable membrane having a retentate side and an opposing permeate side to separate the first permeate stream into a second retentate stream and a second permeate stream;

passing a sweep gas comprising the first retentate stream, the second retentate stream, or a combination thereof across the permeate side of the first selectively permeable membrane; and withdrawing the second permeate stream, wherein the first selectively permeable membrane and the second selectively permeable membrane each comprise a gas permeable layer, and a selective polymer layer disposed on the gas permeable layer;

wherein the first selectively permeable membrane and the second selectively permeable membrane each exhibit a carbon dioxide permeance of from 500 to 3000 GPU at 57° C. and 1 atm feed pressure and a carbon dioxide:nitrogen selectivity of from 10 to 1000 at 57° C. and 1 atm feed pressure, wherein the second permeate stream has a greater concentration of carbon dioxide than the feed gas stream, and wherein the second permeate stream comprises 90% or greater of carbon dioxide in the feed gas with a purity of 95% or greater.

2. The method of claim 1, wherein the feed gas stream comprises a combustion gas.

3. The method of claim 1, wherein the feed gas stream comprises from 5% to 40%, by volume, carbon dioxide.

4. The method of claim 3, wherein the feed gas stream comprises from 5% to 20%, by volume, carbon dioxide.

5. The method of claim 1, wherein the first selectively permeable membrane exhibits a carbon dioxide permeance of from 1000 to 1500 GPU at 57° C. and 1 atm feed pressure and a carbon dioxide:nitrogen selectivity of from 100 to 500 at 57° C. and 1 atm feed pressure.

6. The method of claim 1, wherein the selective polymer layer of the first selectively permeable membrane comprises an amine-containing polymer chosen from polyvinylamine, polyallylamine, polyethyleneimine, poly-2-vinylpiperidine, poly-4-vinylpiperidine, polyaminostyrene, chitosan, copolymers, and blends thereof.

7. The method of claim 6, wherein the amine-containing polymer comprises polyvinylamine.

8. The method of claim 6, wherein the selective polymer layer further comprises an aminoacid salt dispersed within the amine-containing polymer.

9. The method of claim 1, wherein the second selectively permeable membrane has a carbon dioxide permeance of from 1000 to 1500 GPU at 57° C. and 1 atm feed pressure and a carbon dioxide:nitrogen selectivity of from 100 to 500 at 57° C. and 1atm feed pressure.

10. The method of claim 1, wherein the selective polymer layer of the second selectively permeable membrane comprises an amine-containing polymer chosen from polyvinylamine, polyallylamine, polyethyleneimine, poly-2-vinylpiperidine, poly-4-vinylpiperidine, polyaminostyrene, chitosan, copolymers, and blends thereof.

11. The method of claim 10, wherein the amine-containing polymer comprises polyvinylamine.

12. The method of claim 10, wherein the selective polymer layer further comprises an aminoacid salt dispersed within the amine-containing polymer.

13. The method of claim 1, wherein the sweep gas comprises from 0.5% to 5% by volume, carbon dioxide.

14. The method of claim 13, wherein the sweep gas comprises from 1% to 3% by volume, carbon dioxide.

15. The method of claim 1, wherein the first permeate stream is compressed, prior to passing the first permeate stream through the second selectively permeable membrane.

16. The method of claim 15, wherein the first permeate stream is compressed to a pressure of at least 1.5 atm prior to passing the permeate stream through the second selectively permeable membrane.

17. The method of claim 15, wherein the first permeate stream is compressed to a pressure of from 3 to 5 atm prior to passing the first permeate stream through the second selectively permeable membrane.

18. The method of claim 1, further comprising applying a vacuum to the permeate side of the second selectively permeable membrane.

19. The method of claim 18, wherein the vacuum is applied to generate a pressure of from 0.1 to 0.5 atm on the permeate side of the second selectively permeable membrane.

\* \* \* \* \*